United States Patent
Audet

(10) Patent No.: US 8,826,123 B2
(45) Date of Patent: Sep. 2, 2014

(54) TIMESCALE FOR PRESENTING INFORMATION

(75) Inventor: Mathieu Audet, Montrealo (CA)

(73) Assignee: 9224-5489 Quebec Inc., Montreal (CA)

(*) Notice: Subject to any disclaimer, the term of this patent is extended or adjusted under 35 U.S.C. 154(b) by 1540 days.

(21) Appl. No.: 11/754,219

(22) Filed: May 25, 2007

(65) Prior Publication Data

US 2008/0295016 A1    Nov. 27, 2008

(51) Int. Cl.
*G06F 17/00*    (2006.01)

(52) U.S. Cl.
USPC .......................................... 715/243; 715/200

(58) Field of Classification Search
USPC .................. 715/243, 723, 763, 835, 838, 200
See application file for complete search history.

(56) References Cited

U.S. PATENT DOCUMENTS

| | | | |
|---|---|---|---|
| 4,616,336 A | 10/1986 | Robertson et al. | |
| 4,653,021 A | 3/1987 | Takagi | |
| 5,115,504 A | 5/1992 | Belove et al. | |
| 5,148,154 A | 9/1992 | MacKay et al. | |
| 5,241,624 A | 8/1993 | Torres | |
| 5,388,197 A * | 2/1995 | Rayner | 715/723 |
| 5,398,074 A | 3/1995 | Duffield | |
| 5,519,828 A * | 5/1996 | Rayner | 715/723 |
| 5,524,195 A | 6/1996 | Clanton | |
| 5,535,063 A | 7/1996 | Lamming | |
| 5,546,528 A | 8/1996 | Johnston | |
| 5,581,752 A | 12/1996 | Inoue et al. | |
| 5,598,519 A | 1/1997 | Narayanan | |
| 5,602,596 A | 2/1997 | Claussen | |
| 5,606,374 A | 2/1997 | Bertram | |
| 5,621,456 A | 4/1997 | Florin | |
| 5,621,874 A | 4/1997 | Lucas et al. | |
| 5,623,613 A | 4/1997 | Rowe | |
| 5,634,064 A | 5/1997 | Warnock et al. | |
| 5,649,182 A | 7/1997 | Reitz | |
| 5,659,742 A | 8/1997 | Bealtie et al. | |
| 5,663,757 A | 9/1997 | Morales | |
| 5,671,381 A | 9/1997 | Strasnick et al. | |
| 5,673,401 A | 9/1997 | Volk | |

(Continued)

FOREIGN PATENT DOCUMENTS

| | | |
|---|---|---|
| JP | 07-013971 | 1/1995 |
| JP | 07-085080 | 3/1995 |

(Continued)

OTHER PUBLICATIONS

The lifestream approach to reorganizing the information world; Nicolas Carriero, Scott Fertig; Eric Freeman and David Gelernter; Apr. 1995; Yale University.

(Continued)

*Primary Examiner* — Manglesh M Patel
(74) *Attorney, Agent, or Firm* — Mathieu Audet

(57) ABSTRACT

A method for presenting information on a timeline is provided, the method comprising displaying the plurality of documents on the timeline using either a linear or a non-linear timescale. Documents presented along a linear timeline can switch to a non-linear timeline and vice-versa. The plurality of documents can be search results provided along the timeline representing a time attribute of each result. More than one timeline can be used to display documents, each timeline using a timescale that can be similar or dissimilar. An interface and a system for implementing the method is also provided.

20 Claims, 18 Drawing Sheets

(56) References Cited

U.S. PATENT DOCUMENTS

| | | | |
|---|---|---|---|
| 5,677,708 A | 10/1997 | Mattews | |
| 5,680,605 A | 10/1997 | Torres | |
| 5,682,511 A | 10/1997 | Sposato | |
| 5,701,500 A | 12/1997 | Ikeo et al. | |
| 5,713,031 A | 1/1998 | Saito | |
| 5,740,815 A | 4/1998 | Alpins | |
| 5,781,188 A | 7/1998 | Amiot | |
| 5,781,785 A | 7/1998 | Rowe et al. | |
| 5,794,178 A | 8/1998 | Caid et al. | |
| 5,812,124 A | 9/1998 | Eick | |
| 5,822,751 A | 10/1998 | Gray et al. | |
| 5,832,504 A | 11/1998 | Tripathi et al. | |
| 5,838,317 A | 11/1998 | Bolnick et al. | |
| 5,838,326 A * | 11/1998 | Card et al. | 715/775 |
| 5,847,707 A | 12/1998 | Hayashida | |
| 5,850,218 A | 12/1998 | Lajoie | |
| 5,878,410 A | 3/1999 | Zbikowski et al. | |
| 5,900,879 A | 5/1999 | Berry et al. | |
| 5,903,271 A | 5/1999 | Bardon et al. | |
| 5,905,992 A | 5/1999 | Lucas et al. | |
| 5,933,843 A | 8/1999 | Takai | |
| 5,982,369 A | 11/1999 | Sciammarella | |
| 6,003,034 A | 12/1999 | Tuli | |
| 6,005,601 A | 12/1999 | Ohkura | |
| 6,006,227 A | 12/1999 | Freeman et al. | |
| 6,009,442 A | 12/1999 | Chen | |
| 6,012,072 A | 1/2000 | Lucas et al. | |
| 6,020,930 A | 2/2000 | Legrand | |
| 6,023,703 A | 2/2000 | Hill | |
| 6,028,600 A | 2/2000 | Rosin | |
| 6,029,164 A | 2/2000 | Birrell et al. | |
| 6,037,933 A | 3/2000 | Blonstein | |
| 6,061,062 A * | 5/2000 | Venolia | 715/856 |
| 6,064,384 A | 5/2000 | Ho | |
| 6,067,554 A | 5/2000 | Hohensee et al. | |
| 6,081,817 A | 6/2000 | Taguchi | |
| 6,088,032 A | 7/2000 | Mackinlay | |
| 6,108,657 A | 8/2000 | Shoup et al. | |
| 6,111,578 A | 8/2000 | Tesler | |
| 6,119,120 A | 9/2000 | Miller | |
| 6,149,519 A | 11/2000 | Osaki et al. | |
| 6,151,059 A | 11/2000 | Schein | |
| 6,151,604 A | 11/2000 | Wlaschin et al. | |
| 6,151,702 A | 11/2000 | Overturf | |
| 6,163,345 A | 12/2000 | Noguchi | |
| 6,175,362 B1 | 1/2001 | Harms | |
| 6,175,845 B1 | 1/2001 | Smith et al. | |
| 6,185,551 B1 | 2/2001 | Birrell et al. | |
| 6,188,406 B1 | 2/2001 | Fong | |
| 6,189,012 B1 | 2/2001 | Mital et al. | |
| 6,202,068 B1 | 3/2001 | Kraay et al. | |
| 6,211,873 B1 | 4/2001 | Moyer | |
| 6,236,994 B1 | 5/2001 | Swartz et al. | |
| 6,237,004 B1 | 5/2001 | Dodson et al. | |
| 6,240,421 B1 | 5/2001 | Stolarz | |
| 6,243,093 B1 | 6/2001 | Czerwinski et al. | |
| 6,243,724 B1 | 6/2001 | Mander et al. | |
| 6,253,218 B1 | 6/2001 | Aoki et al. | |
| 6,262,722 B1 | 7/2001 | Allison | |
| 6,266,059 B1 | 7/2001 | Mattews | |
| 6,266,098 B1 | 7/2001 | Cove | |
| 6,281,898 B1 | 8/2001 | Nikolovska et al. | |
| 6,281,940 B1 | 8/2001 | Sciammarella | |
| 6,289,362 B1 | 9/2001 | Van Der Meer | |
| 6,295,639 B1 | 9/2001 | Van Der Meer | |
| 6,308,187 B1 | 10/2001 | DeStefano | |
| 6,313,851 B1 | 11/2001 | Matthews | |
| 6,337,698 B1 | 1/2002 | Keely et al. | |
| 6,344,880 B1 | 2/2002 | Takahashi | |
| 6,351,765 B1 * | 2/2002 | Pietropaolo et al. | 709/218 |
| 6,366,299 B1 | 4/2002 | Lanning | |
| 6,388,665 B1 | 5/2002 | Linnett et al. | |
| 6,392,651 B1 | 5/2002 | Stradley | |
| 6,418,556 B1 | 7/2002 | Bennington | |
| 6,425,129 B1 | 7/2002 | Sciammarella | |
| 6,456,938 B1 | 9/2002 | Barnard | |
| 6,457,017 B2 | 9/2002 | Watkins | |
| 6,463,431 B1 | 10/2002 | Schmitt | |
| 6,491,585 B1 | 12/2002 | Miyamoto et al. | |
| 6,501,469 B1 | 12/2002 | MacPhail | |
| 6,507,858 B1 | 1/2003 | Kanerva et al. | |
| 6,538,672 B1 | 3/2003 | Dobbelaar | |
| 6,544,294 B1 * | 4/2003 | Greenfield et al. | 715/234 |
| 6,553,310 B1 | 4/2003 | Lopke | |
| 6,556,225 B1 | 4/2003 | MacPhail | |
| 6,577,350 B1 | 6/2003 | Proehl | |
| 6,594,673 B1 | 7/2003 | Smith et al. | |
| 6,598,043 B1 | 7/2003 | Baclawski | |
| 6,600,501 B1 | 7/2003 | Israel et al. | |
| D478,090 S | 8/2003 | Nguyen | |
| 6,604,144 B1 | 8/2003 | Anders | |
| 6,613,100 B2 | 9/2003 | Miller | |
| 6,636,246 B1 | 10/2003 | Gallo | |
| 6,638,313 B1 | 10/2003 | Freeman et al. | |
| 6,642,939 B1 | 11/2003 | Vallone | |
| 6,650,343 B1 | 11/2003 | Fujita et al. | |
| 6,662,357 B1 | 12/2003 | Bowman-Amuah | |
| 6,668,102 B2 | 12/2003 | Chiba et al. | |
| 6,671,692 B1 | 12/2003 | Marpe et al. | |
| 6,671,693 B1 | 12/2003 | Marpe et al. | |
| 6,675,158 B1 | 1/2004 | Rising et al. | |
| 6,678,671 B1 | 1/2004 | Petrovic et al. | |
| 6,678,694 B1 | 1/2004 | Zimmermann et al. | |
| 6,678,891 B1 | 1/2004 | Wilcox | |
| 6,690,391 B1 | 2/2004 | Proehl et al. | |
| 6,691,127 B1 | 2/2004 | Bauer et al. | |
| 6,694,326 B2 | 2/2004 | Mayhe et al. | |
| 6,694,335 B1 | 2/2004 | Hopmann et al. | |
| 6,694,486 B2 | 2/2004 | Frank et al. | |
| 6,701,318 B2 | 3/2004 | Fox et al. | |
| 6,704,727 B1 | 3/2004 | Kravets | |
| 6,704,744 B1 | 3/2004 | Williamson et al. | |
| 6,725,232 B2 | 4/2004 | Bradley et al. | |
| 6,725,427 B2 | 4/2004 | Freeman et al. | |
| 6,735,591 B2 | 5/2004 | Khan | |
| 6,738,787 B2 | 5/2004 | Stead | |
| 6,754,660 B1 | 6/2004 | MacPhail | |
| 6,768,999 B2 | 7/2004 | Prager et al. | |
| 6,772,148 B2 | 8/2004 | Baclawski | |
| 6,859,803 B2 | 2/2005 | Dagtas | |
| 6,862,027 B2 | 3/2005 | Andrews | |
| 6,879,946 B2 | 4/2005 | Rong et al. | |
| 6,889,220 B2 | 5/2005 | Wolff et al. | |
| 6,915,254 B1 | 7/2005 | Heinze | |
| 6,915,489 B2 | 7/2005 | Gargi | |
| 6,922,699 B2 | 7/2005 | Schuetze | |
| 6,925,611 B2 | 8/2005 | SanGiovanni | |
| 6,948,124 B2 | 9/2005 | Combs | |
| 6,987,220 B2 | 1/2006 | Holcombe | |
| 7,007,034 B1 | 2/2006 | Hartman, Jr. | |
| 7,020,848 B2 | 3/2006 | Rosenzweig | |
| 7,055,104 B2 | 5/2006 | Billmaier | |
| 7,080,394 B2 | 7/2006 | Istvan | |
| 7,107,531 B2 | 9/2006 | Billmaier | |
| 7,107,532 B1 | 9/2006 | Billmaier | |
| 7,113,975 B2 | 9/2006 | Nakayama | |
| 7,117,199 B2 | 10/2006 | Frank | |
| 7,137,067 B2 | 11/2006 | Yanase | |
| 7,139,006 B2 | 11/2006 | Wittenburg | |
| 7,149,983 B1 | 12/2006 | Robertson | |
| 7,155,675 B2 | 12/2006 | Billmaier | |
| 7,159,177 B2 | 1/2007 | Billmaier | |
| 7,199,809 B1 | 4/2007 | Lacy | |
| 7,218,325 B1 * | 5/2007 | Buck | 345/440.2 |
| 7,234,114 B2 | 6/2007 | Kurtz et al. | |
| 7,266,768 B2 | 9/2007 | Ferlitsch | |
| 7,289,981 B2 | 10/2007 | Chang | |
| 7,333,120 B2 * | 2/2008 | Venolia | 345/661 |
| 7,334,191 B1 | 2/2008 | Sivan | |
| 7,343,241 B2 * | 3/2008 | Krishnan et al. | 701/113 |
| 7,346,600 B2 | 3/2008 | Nakao | |
| 7,346,850 B2 | 3/2008 | Swartz | |
| 7,350,157 B1 | 3/2008 | Billmaier | |
| 7,353,461 B2 | 4/2008 | Davidsson | |

(56) References Cited

U.S. PATENT DOCUMENTS

| | | | |
|---|---|---|---|
| 7,366,994 B2* | 4/2008 | Loui | 715/764 |
| 7,372,473 B2* | 5/2008 | Venolia | 345/661 |
| 7,380,260 B1 | 5/2008 | Billmaier | |
| 7,398,002 B2* | 7/2008 | Hsiao et al. | 386/52 |
| 7,415,662 B2* | 8/2008 | Rothmuller et al. | 715/200 |
| 7,418,674 B2 | 8/2008 | Robbins | |
| 7,444,598 B2 | 10/2008 | Horvitz | |
| 7,448,950 B2 | 11/2008 | Matsumoto | |
| 7,502,819 B2 | 3/2009 | Alonso | |
| 7,555,718 B2* | 6/2009 | Girgensohn et al. | 715/723 |
| 7,594,246 B1 | 9/2009 | Billmaier | |
| 7,606,819 B2 | 10/2009 | Audet | |
| 7,629,527 B2 | 12/2009 | Hiner | |
| 7,650,569 B1 | 1/2010 | Allen | |
| 7,661,075 B2 | 2/2010 | Lahdesmaki | |
| 7,680,817 B2 | 3/2010 | Audet | |
| 7,680,853 B2* | 3/2010 | Yu et al. | 707/708 |
| 7,681,128 B2 | 3/2010 | Yamamoto | |
| 7,681,149 B2 | 3/2010 | Lahdesmaki | |
| 7,688,322 B2* | 3/2010 | Kapler et al. | 345/440 |
| 7,703,040 B2 | 4/2010 | Cutrell | |
| 7,716,194 B2* | 5/2010 | Williams et al. | 707/705 |
| 7,735,102 B1 | 6/2010 | Billmaier | |
| 7,739,598 B2* | 6/2010 | Porter et al. | 715/723 |
| 7,739,622 B2* | 6/2010 | DeLine et al. | 715/835 |
| 7,757,253 B2 | 7/2010 | Rappaport | |
| 7,761,471 B1 | 7/2010 | Lee | |
| 7,765,184 B2 | 7/2010 | Makela | |
| 7,765,195 B2 | 7/2010 | Miller | |
| 7,770,117 B1 | 8/2010 | Uy | |
| 7,788,247 B2 | 8/2010 | Wang | |
| 7,788,592 B2 | 8/2010 | William | |
| 7,822,735 B2 | 10/2010 | Suda | |
| 7,870,489 B2 | 1/2011 | Serita | |
| 7,877,690 B2* | 1/2011 | Margulis | 715/723 |
| 7,899,818 B2 | 3/2011 | Stonehocker | |
| 7,902,741 B2 | 3/2011 | Iwanaga | |
| 7,965,292 B2* | 6/2011 | Buck | 345/440.2 |
| 7,991,720 B2 | 8/2011 | Mander | |
| 8,010,508 B2 | 8/2011 | Audet | |
| 8,010,892 B2 | 8/2011 | Audet | |
| 8,010,903 B2* | 8/2011 | Dieberger et al. | 715/764 |
| 8,091,033 B2* | 1/2012 | von Sichart et al. | 715/751 |
| 8,099,680 B1 | 1/2012 | Kolde | |
| 8,607,155 B2* | 12/2013 | Audet | 715/784 |
| 2001/0025288 A1 | 9/2001 | Yanase | |
| 2001/0034766 A1 | 10/2001 | Morimoto | |
| 2001/0036356 A1* | 11/2001 | Weaver et al. | 386/52 |
| 2002/0033848 A1 | 3/2002 | Sclammarello | |
| 2002/0035563 A1 | 3/2002 | Suda et al. | |
| 2002/0056129 A1 | 5/2002 | Blackketter | |
| 2002/0070958 A1 | 6/2002 | Yeo | |
| 2002/0078440 A1 | 6/2002 | Feinberg | |
| 2002/0087530 A1 | 7/2002 | Smith | |
| 2002/0096831 A1 | 7/2002 | Nakayama | |
| 2002/0101458 A1 | 8/2002 | SanGiovanni | |
| 2002/0152474 A1 | 10/2002 | Dudkiewicz | |
| 2003/0001898 A1 | 1/2003 | Bernhardson | |
| 2003/0046693 A1 | 3/2003 | Billmaier | |
| 2003/0046694 A1 | 3/2003 | Istvan | |
| 2003/0046695 A1 | 3/2003 | Billmaier | |
| 2003/0052900 A1 | 3/2003 | Card | |
| 2003/0090524 A1 | 5/2003 | Segerberg | |
| 2003/0093260 A1 | 5/2003 | Dagtas | |
| 2003/0093792 A1 | 5/2003 | Labeeb | |
| 2003/0120681 A1 | 6/2003 | Baclawski | |
| 2003/0120737 A1 | 6/2003 | Lytile et al. | |
| 2003/0132971 A1 | 7/2003 | Billmaier | |
| 2003/0149939 A1 | 8/2003 | Hubel | |
| 2003/0163468 A1 | 8/2003 | Freeman et al. | |
| 2003/0167902 A1 | 9/2003 | Hiner | |
| 2003/0190950 A1 | 10/2003 | Matsumoto | |
| 2003/0237047 A1 | 12/2003 | Borson | |
| 2004/0024738 A1 | 2/2004 | Yamane | |
| 2004/0054968 A1 | 3/2004 | Savage | |
| 2004/0064473 A1 | 4/2004 | Thomas et al. | |
| 2004/0090439 A1 | 5/2004 | Dillner | |
| 2004/0111401 A1 | 6/2004 | Chang | |
| 2004/0125143 A1 | 7/2004 | Deaton | |
| 2004/0128277 A1 | 7/2004 | Mander | |
| 2004/0128377 A1 | 7/2004 | Sadaghiany | |
| 2004/0139143 A1 | 7/2004 | Canakapalli | |
| 2004/0150657 A1 | 8/2004 | Wittenburg et al. | |
| 2004/0151469 A1* | 8/2004 | Engholm et al. | 386/52 |
| 2004/0153445 A1* | 8/2004 | Horvitz et al. | 707/3 |
| 2004/0212636 A1* | 10/2004 | Stata et al. | 345/703 |
| 2004/0233238 A1 | 11/2004 | Lahdesmaki | |
| 2004/0233239 A1 | 11/2004 | Lahdesmaki | |
| 2004/0263519 A1 | 12/2004 | Andrews | |
| 2005/0060667 A1 | 3/2005 | Robins | |
| 2005/0246119 A1* | 11/2005 | Koodali | 702/79 |
| 2006/0010382 A1* | 1/2006 | Ejiri et al. | 715/712 |
| 2006/0106764 A1* | 5/2006 | Girgensohn et al. | 707/3 |
| 2006/0136466 A1 | 6/2006 | Weiner | |
| 2006/0242178 A1 | 10/2006 | Butterfield | |
| 2006/0248129 A1 | 11/2006 | Carnes | |
| 2006/0259511 A1 | 11/2006 | Boerries | |
| 2007/0005576 A1 | 1/2007 | Cutrell | |
| 2007/0007884 A1 | 1/2007 | Iwanaga | |
| 2007/0061855 A1 | 3/2007 | Serita | |
| 2007/0067290 A1 | 3/2007 | Makela | |
| 2007/0156654 A1 | 7/2007 | Ravinarayanan | |
| 2007/0171224 A1 | 7/2007 | MacPherson | |
| 2007/0204218 A1 | 8/2007 | Weber | |
| 2007/0214169 A1 | 9/2007 | Audet | |
| 2007/0216694 A1 | 9/2007 | Audet | |
| 2007/0239676 A1 | 10/2007 | Stonehocker | |
| 2007/0271508 A1 | 11/2007 | Audet | |
| 2008/0000126 A1 | 1/2008 | Teza et al. | |
| 2008/0019371 A1 | 1/2008 | Anschutz | |
| 2008/0022199 A1 | 1/2008 | Sako et al. | |
| 2008/0058106 A1 | 3/2008 | Audet et al. | |
| 2008/0071822 A1 | 3/2008 | Audet et al. | |
| 2008/0072169 A1 | 3/2008 | Audet et al. | |
| 2008/0092038 A1 | 4/2008 | Audet | |
| 2008/0133579 A1 | 6/2008 | Lim | |
| 2008/0134013 A1 | 6/2008 | Audet | |
| 2008/0134022 A1 | 6/2008 | Audet | |
| 2008/0141115 A1 | 6/2008 | Audet | |
| 2008/0243778 A1 | 10/2008 | Behnen | |
| 2008/0270361 A1 | 10/2008 | Meyer | |
| 2008/0295016 A1 | 11/2008 | Audet | |
| 2008/0299989 A1 | 12/2008 | King | |
| 2008/0313536 A1* | 12/2008 | Larsen | 715/273 |
| 2009/0019371 A1 | 1/2009 | Audet | |
| 2009/0048981 A1 | 2/2009 | Millan | |
| 2009/0055413 A1 | 2/2009 | Audet | |
| 2009/0055726 A1 | 2/2009 | Audet | |
| 2009/0055729 A1 | 2/2009 | Audet | |
| 2009/0055763 A1 | 2/2009 | Audet | |
| 2009/0055776 A1 | 2/2009 | Audet | |
| 2009/0063552 A1 | 3/2009 | Jones | |
| 2009/0070662 A1 | 3/2009 | Audet | |
| 2009/0083260 A1 | 3/2009 | Artom | |
| 2009/0083787 A1* | 3/2009 | Morris | 725/32 |
| 2009/0228788 A1 | 9/2009 | Audet | |
| 2009/0287693 A1 | 11/2009 | Audet | |
| 2009/0288006 A1 | 11/2009 | Audet et al. | |
| 2010/0082427 A1 | 4/2010 | Burgener | |
| 2010/0082653 A1 | 4/2010 | Nair | |
| 2010/0094890 A1 | 4/2010 | Bokor | |
| 2010/0145976 A1 | 6/2010 | Higgins | |
| 2010/0169823 A1 | 7/2010 | Audet | |
| 2010/0185509 A1 | 7/2010 | Higgins | |
| 2010/0325132 A1 | 12/2010 | Liu | |
| 2010/0325134 A1 | 12/2010 | Galfond | |
| 2010/0332512 A1 | 12/2010 | Shpits | |
| 2010/0333031 A1 | 12/2010 | Castelli | |
| 2011/0078166 A1 | 3/2011 | Oliver | |
| 2011/0202866 A1* | 8/2011 | Huang et al. | 715/779 |
| 2011/0307814 A1 | 12/2011 | Audet | |
| 2012/0159320 A1 | 6/2012 | Audet | |
| 2012/0198385 A1 | 8/2012 | Audet et al. | |
| 2012/0198389 A1 | 8/2012 | Audet | |

(56) References Cited

U.S. PATENT DOCUMENTS

| | | |
|---|---|---|
| 2012/0249581 A1 | 10/2012 | Cassistat |
| 2012/0260204 A1 | 10/2012 | Audet |
| 2012/0299926 A1* | 11/2012 | Hodes et al. ............ 345/440 |
| 2013/0080880 A1 | 3/2013 | Cassistat |
| 2013/0080888 A1 | 3/2013 | Audet |
| 2013/0263050 A1* | 10/2013 | Audet .................... 715/810 |

FOREIGN PATENT DOCUMENTS

| | | |
|---|---|---|
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO0122194 | 3/2001 |
| WO | WO0163378 | 8/2001 |
| WO | WO0198881 | 12/2001 |
| WO | WO03032199 | 4/2003 |
| WO | WO2005/045756 | 5/2005 |
| WO | WO 2005/045756 | 5/2005 |
| WO | WO2005083595 | 9/2005 |
| WO | WO 2007/095997 | 8/2007 |
| WO | WO2007109890 A1 | 10/2007 |
| WO | WO 2008/030779 | 3/2008 |

OTHER PUBLICATIONS

"TimeScape: A Time Machine for the Desktop Environment", ACM UIST'99, 1999 Jun Rekimoto Interaction Laboratory Sony Computer Science Laboratories, Inc. Mar. 14, 2013, Higashi-gotanda, Shinagawa-ku, Tokyo 141-0022 Japan.

Time-Machine Computing: A Time-centric Approach for the Information Environment, ACM UIST'99, 1999 Jun Rekimoto Interaction Laboratory Sony Computer Science Laboratories, Inc. Mar. 14, 2013, Higashi-gotanda, Shinagawa-ku, Tokyo 141-0022 Japan.

* cited by examiner

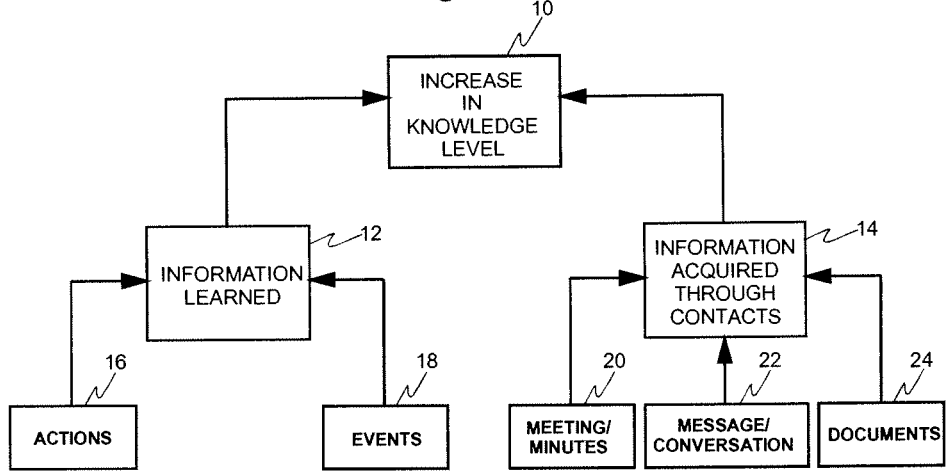
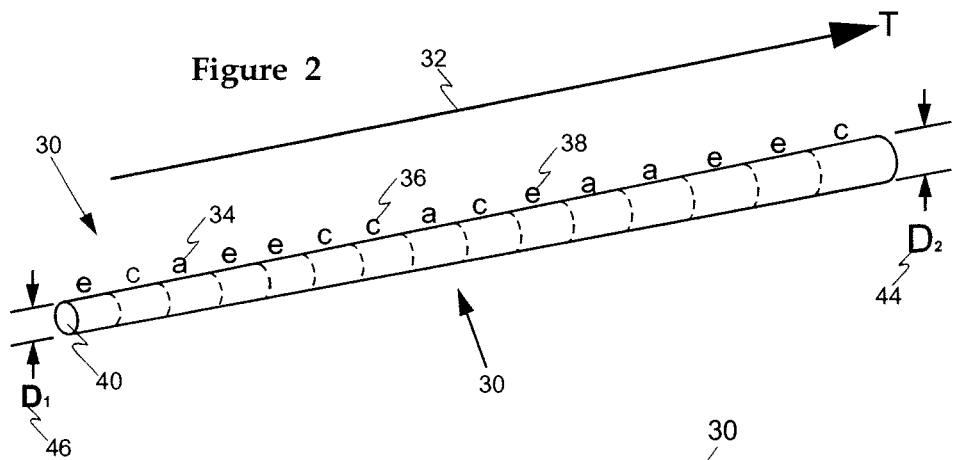
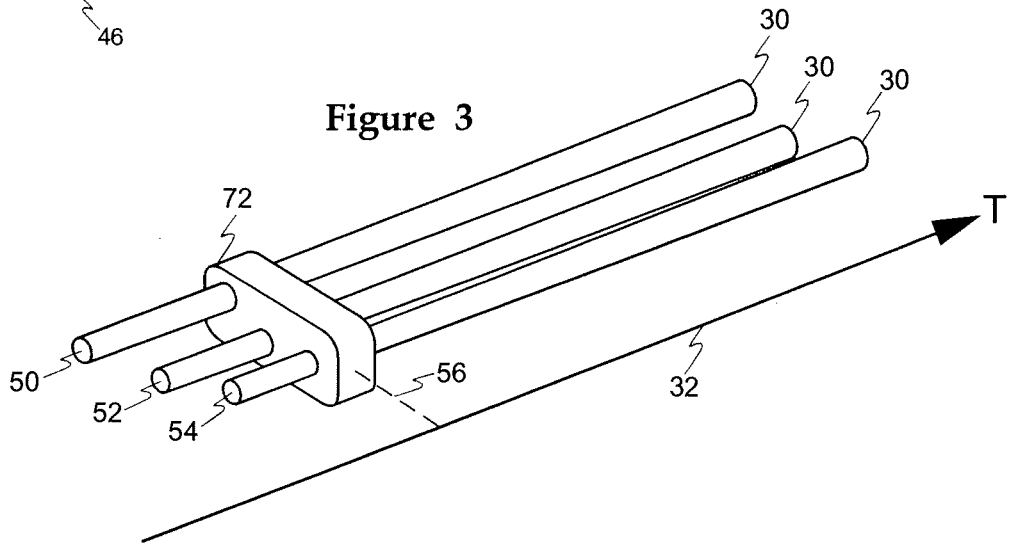

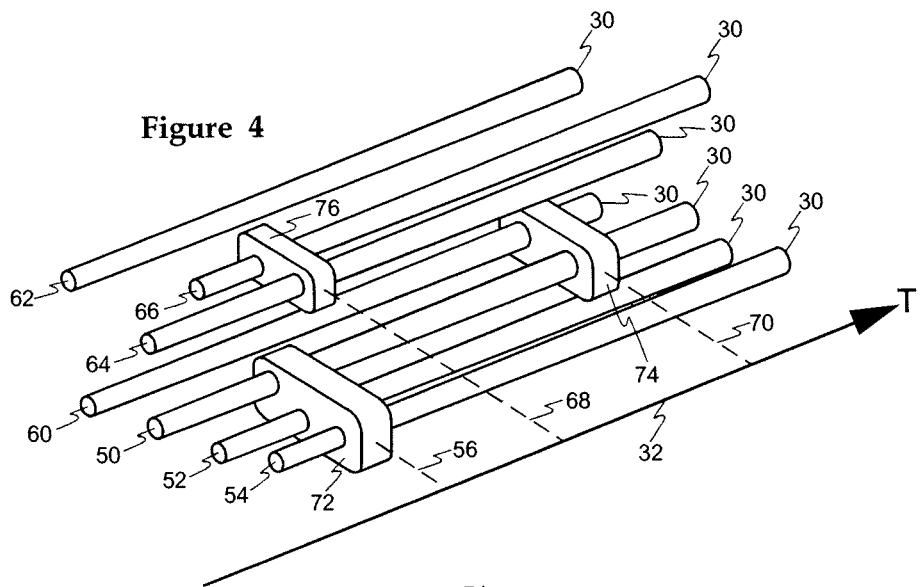
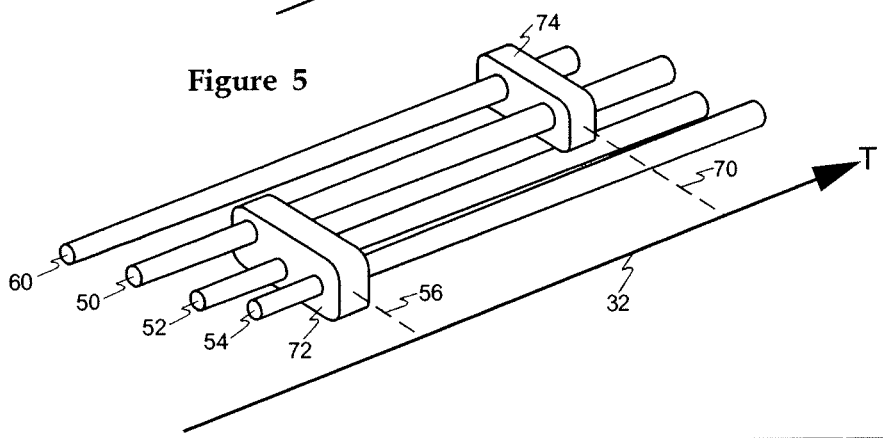
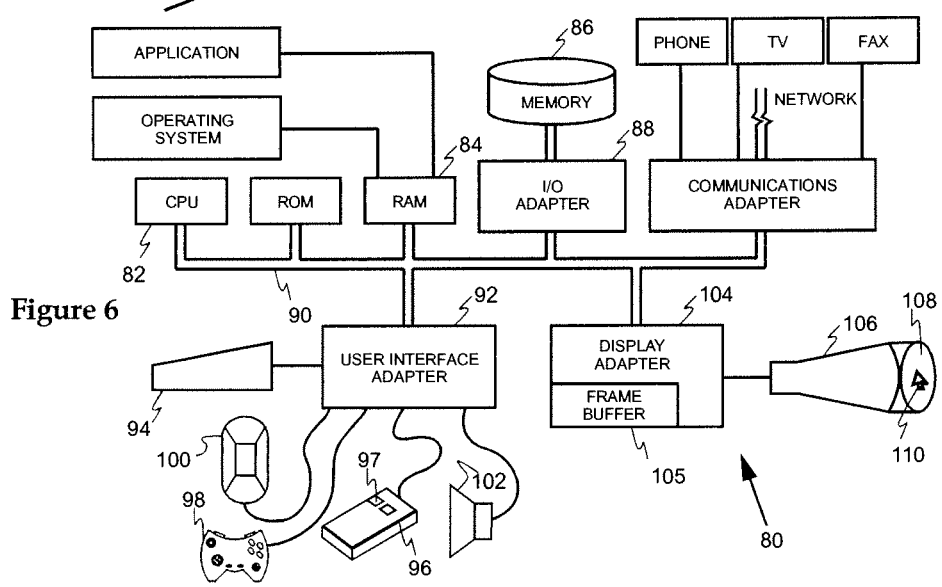

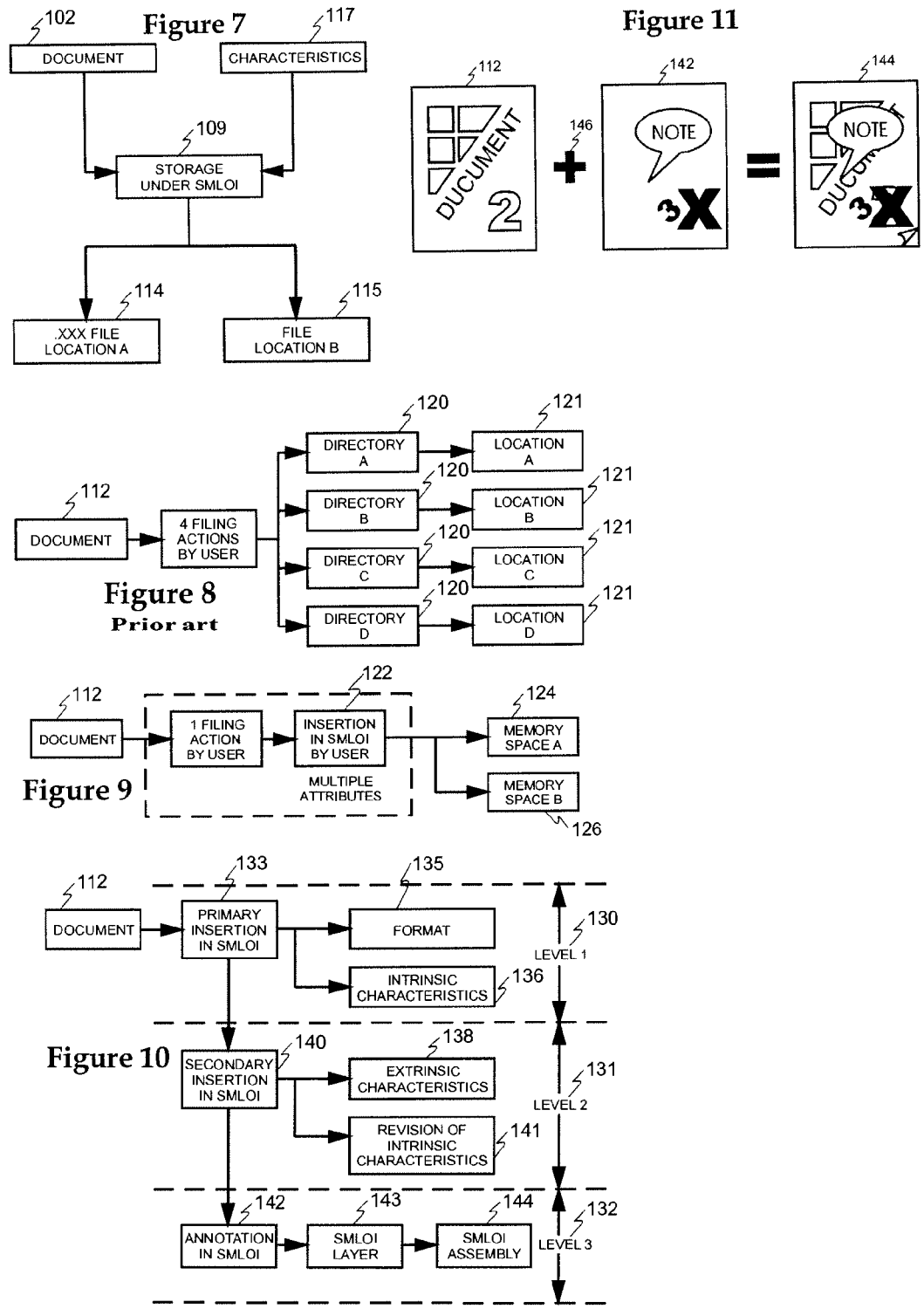

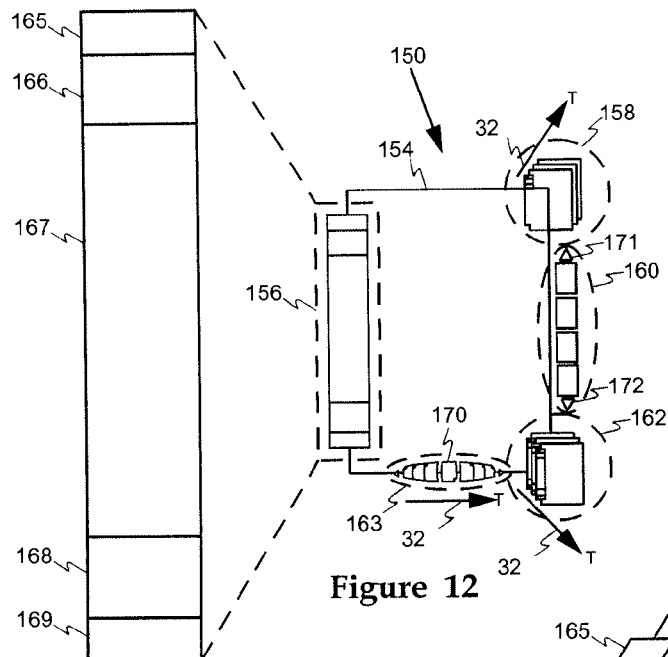
Figure 12
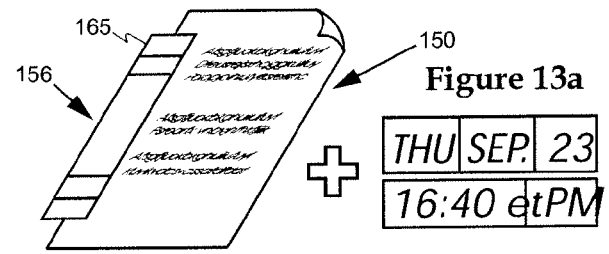
Figure 13a
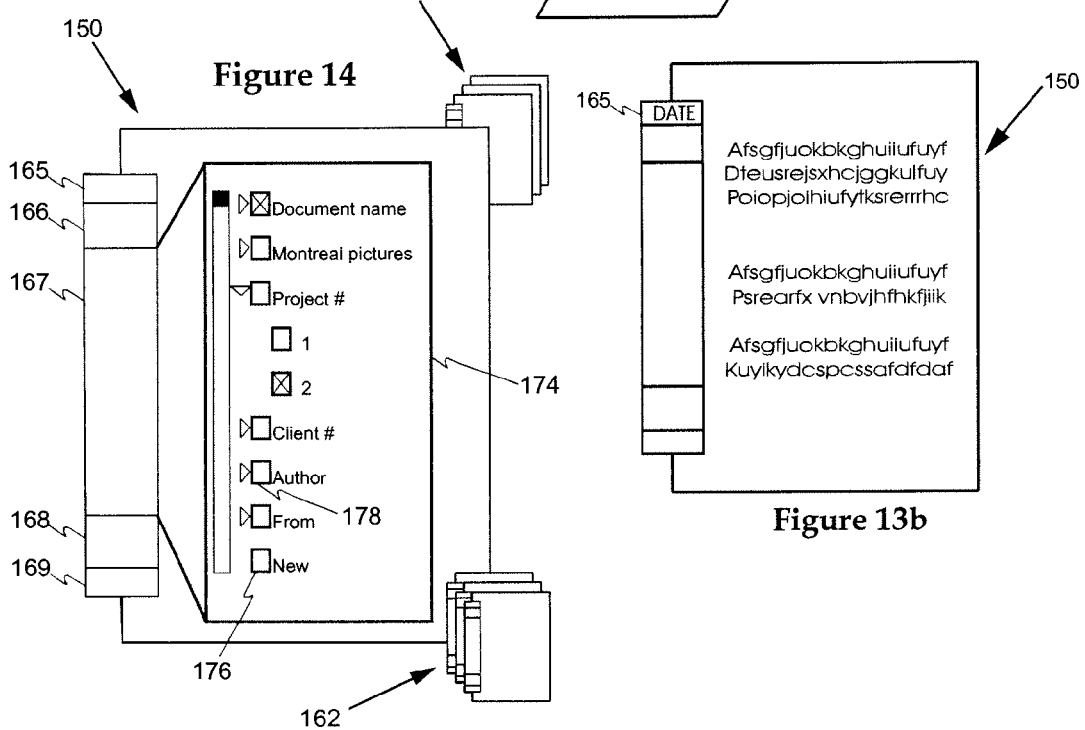
Figure 14
Figure 13b

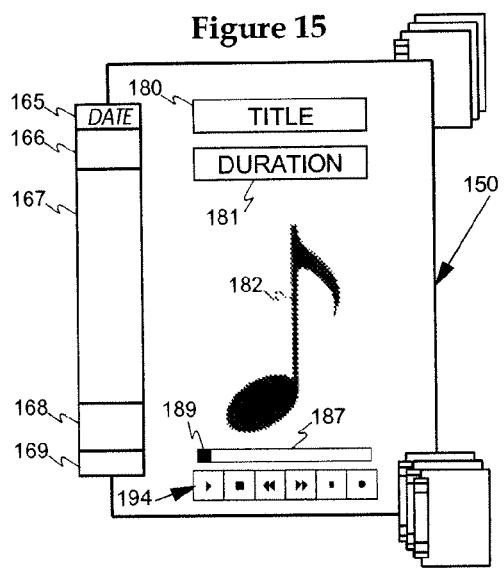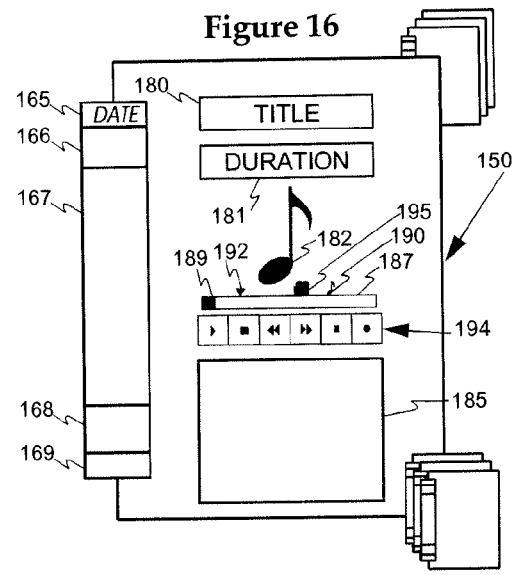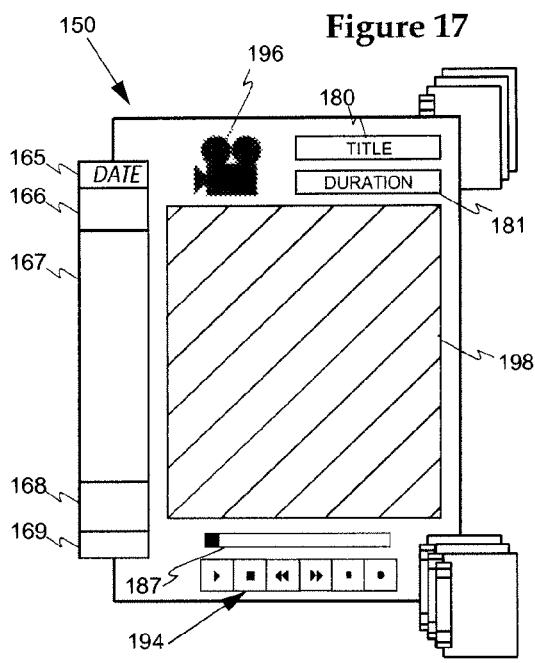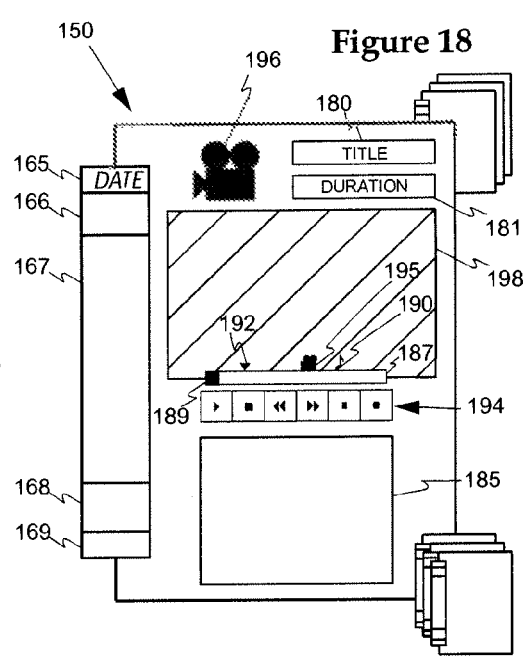

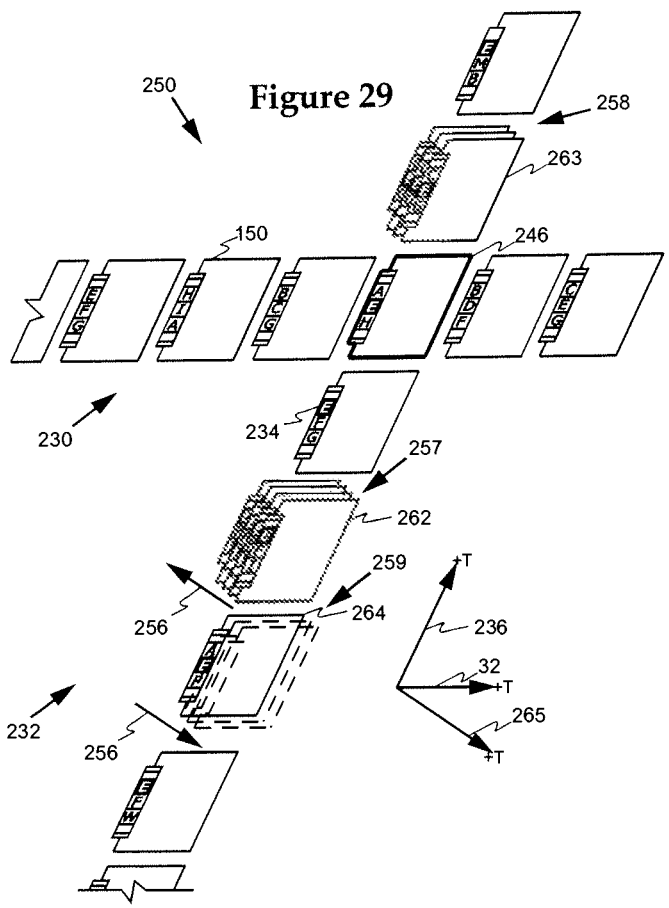
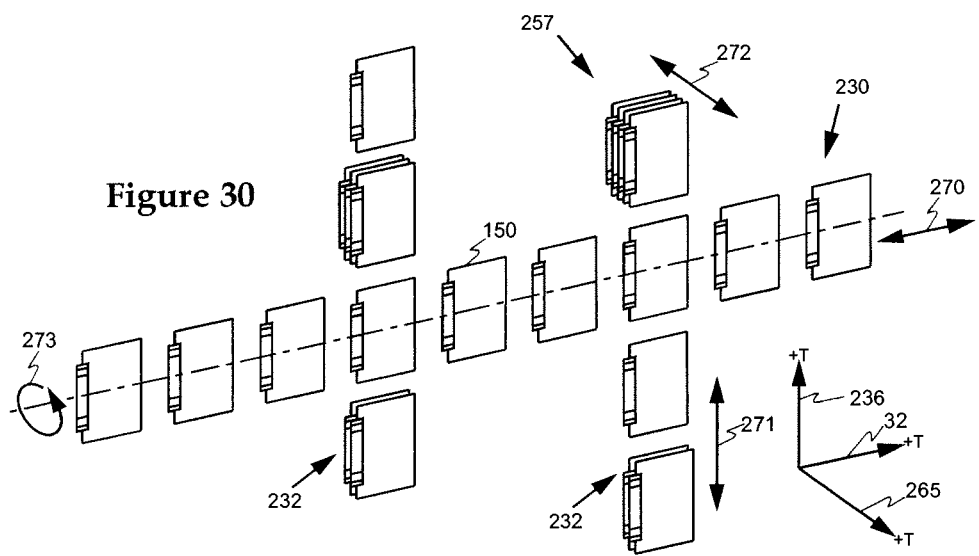

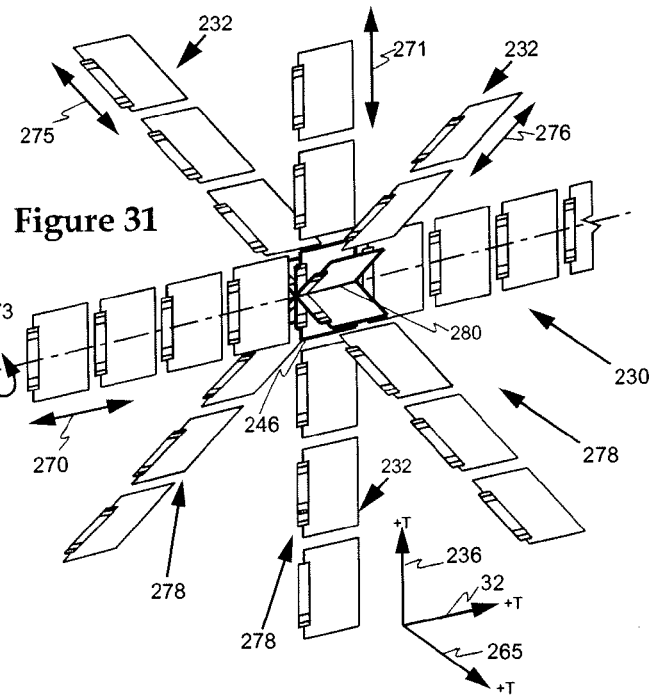
Figure 31
Figure 32
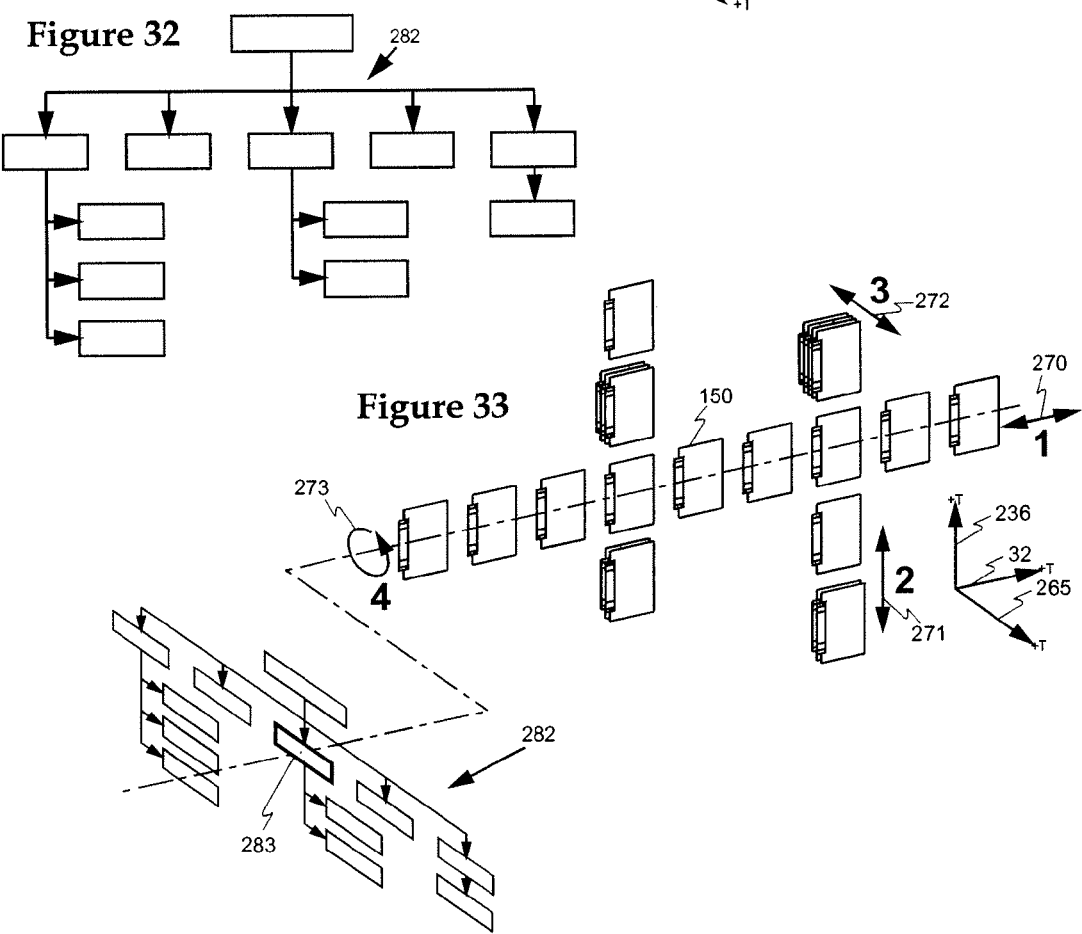
Figure 33

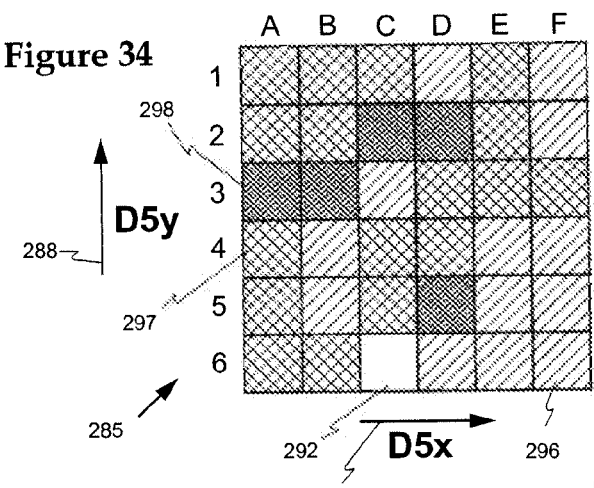
Figure 34
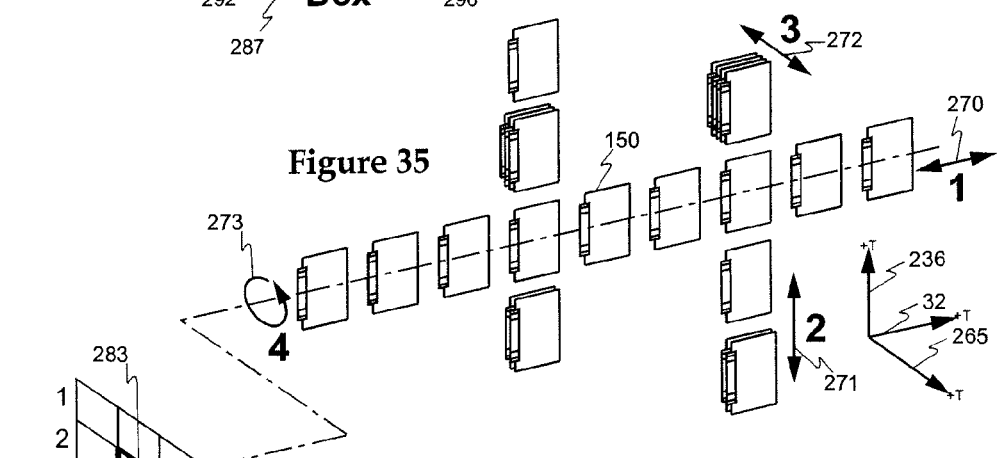
Figure 35
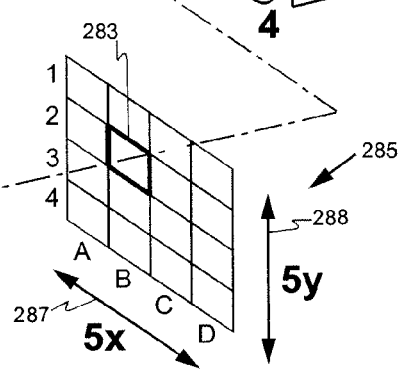
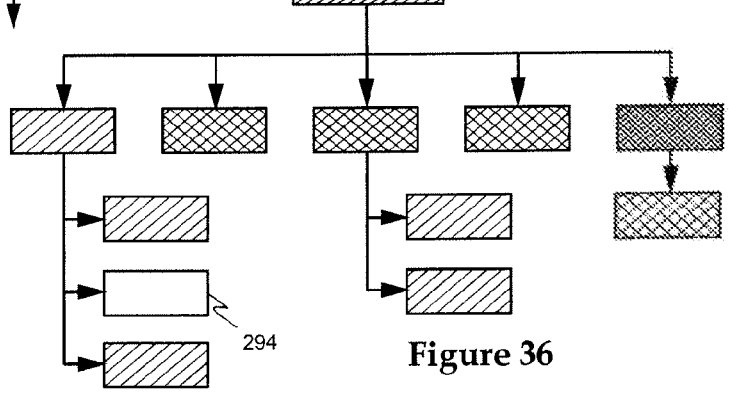
Figure 36

TIMESCALE FOR PRESENTING INFORMATION

BACKGROUND OF THE INVENTION

1. Field of the Invention

This invention relates generally to computer systems and more specifically to man-machine interfaces that facilitate information localization and organization.

2. Description of the Related Art

Computer systems are changing the way we live. They give access to a tremendous computing power. Now everybody can own and operate a computer system. The evolution of computer systems and software happens quite rapidly. Thirty-five years ago computers were huge mainframe units with less computer power than today's small calculators; now we have small and powerful computer systems that are relatively inexpensive.

Because they have become sufficiently powerful, computer systems are now part of our everyday communication tools, allowing their users to store larger and larger quantities of data (i.e. information). Given the ever-increasing scale and diversity of information and use of the Internet, improving the technology of information retrieval is important. Information on every form (i.e. data, audio, picture, video . . . ) is now easily accessible like never before with available networks (for instance the Internet). Therefore, the data quantity the computer system user has to deal with is growing at an accelerated rate. The volume of information is already so high that the time necessary to deal properly with it is often unacceptable especially for professionals, scientists and business people. In order for that information to become actually usable knowledge, it needs to be easily accessible, usable and understandable.

Evolution of computer science over recent years has allowed nearly all types of information to be digitized and transformed into a form a computer can handle. The sources of information are numerous, therefore it is difficult for prior art computer systems to store information in a manner that: A) allows retrieval through a common process/presentation, B) allows the storage structure to be adjusted to his/her thinking process, C) allows the user to create links between the elements of information and D) provides visualization that clearly shows the continuity between different elements of information that are using a different time frame. In consequence, the task of efficiently gathering and extracting information from computer systems may be both difficult and tedious.

The systems well known in the art, however, are designed so that the user has to adapt to the computer systems rather than the other way around. Furthermore, the filing process in the computer system will generally lead to some extent, to the loss of the flow of information, as portions of information are separated during the filing process. Creating multiple links is usually tedious, complicated, requires self-discipline and is very costly in terms of time and memory space.

Conventional computer systems for organizing information are often implemented as part of the operating system of the computer system and are therefore provided as a basic utility to the user of the system to allow the user to organize information in a manner embedded in the operating system.

The main organizing system that is usually provided with existing operating systems is the hierarchical filing system. The hierarchical filing system is well known in the prior art and provides a hierarchy of folders (i.e. directories or subdirectories) into which the user may store information, such as text documents, data, pictures, videos, and music files.

Classification and accessibility to the information usually require user knowledge of numerous applications, as well as self-discipline in the mapping of the data storage system. Each type of file has unique software that is suited to open it. Now, the Internet provides some kind of interchangeability between files of differing format although the interchangeability is often limited to Internet related files (i.e. HTML, XML, JAVA . . . ). Even if the meaning of one information as part of a group of information is critical, generally it is not possible to have a global overview of all the various types of information recorded because of the number of different programs needed to visualize the different file types. The links between various files relate to a common topic and are not obvious to the user.

The most popular hierarchical filing system in operating systems are Windows Explorer™ on Windows™ operating system and the Finder™ on the Macintosh™ operating system. Despite popularity, these systems provide tools that manage efficiently only small quantities of information at a time. These systems both remain restrained to filing by file names using the "save as" function in most applications. With this kind of classification a user can only have a "local" view on what is stored in the computer system; a problem typically occurs when the information quantity is too large and diversified. The problem is exacerbated if links between the different information are provided.

While the hierarchical filing system allows a user to specify a structure within which to file and store information in order to avoid the clutter of a single folder receptacle, the hierarchical structure forces the computer user to be as organized as possible in filing information. If the user has difficulty in filing documents because of the difficulty in deciding the proper categories for the document (e.g. the document does not clearly apply to only one specific folder), the user can file the document in a folder where it will be difficult to retrieve considering it could have been placed logically in many different folders. The usual manner prior art systems use would be to save a copy of a document in as many different directories as there are links and save linked documents in the same directories. Such an approach is labor-intensive, requires considerable self-discipline, and is extremely costly in terms of time and memory space. Furthermore, the links between the documents remain non-evident.

As more and more documents are stored in the computer system memory, an increasing number of documents are arbitrarily stored in the hierarchical filing system. The user begins to have a bewildering clutter of documents in every folder. Some of the documents are misplaced or should have been located in many folders at the same time. With time, the user's needs change and the hierarchical filing system must be updated with newer considerations but most users are dissuaded because of the known difficulty and time requirements. Usually, users prefer to continue saving files to the same directories and folders and then wishing they could remember where the files were stored. In addition, the time needed to search in that kind of hierarchical filing system becomes more and more important as the number of files is growing.

It should be noted that the difficulty in filing documents in a computer system also affects the way the user interacts with the computer system in that the user attempts to avoid the difficult work involved in filing a document that is hard to categorize. This tends to result in the computer becoming cluttered with documents that are hard to categorize or otherwise filed or the user does not attempt to place the documents in the computer system memory at all because of the realization it will be difficult to organize. This effect tends to negate the advantages of a filing system that has a hierarchical filing system with a graphical user interface.

Every user has a preferred manner to file information in a computer system. Some prefer a file name to distinguish each document while others will implement different hierarchical architecture. Other users will file information according to time. It is hard for someone else to understand what the computer system is keeping in its memory considering the different ways users can tailor the hierarchical filing system. It is hard to understand what is important, what is not, and what is related to what. Interchangeable knowledge is still difficult to attain between computer systems users. This is obvious in that it is often difficult to understand the information on an unfamiliar computer and the time needed to familiarize oneself with an unfamiliar system is often time-prohibitive.

Prior art information organizing systems usually do not provide a way to easily understand links between the information. Every information is usually considered as a unique piece of information and only the creator of the information is (really) aware as to what it relates to. An E-mail, a web page, a spreadsheet, or a text document are certainly information but the value they have is limited as long as the links between them are not obvious to another user. Computer system do not have information organizing system that allow the user to perceive efficiently the links that connect information elements in an "understandable story" to get the whole meaning of the information. That is, the user is still oblivious to the trends underneath the information.

When one is given a document to review, there is often a desire to annotate the electronic document similar to annotating a paper copy. Doing so with an electronic document will, similar to the paper version, result in permanent alteration of the base document unless a second copy is made. Furthermore, if different notes and comments are aimed at different individuals, there needs to be as many different copies as there are targets or receivers. It then may be desirable that such annotations be made on a layer that does not alter the original document to avoid creating new documents for each desired target.

In addition, conventional information organizing systems suffer from at least another disadvantage: they do not provide a tool to easily search and visualize the search results starting with an arbitrary information element. Search results provided by conventional information organizing system are given in order of relevancy using typed text as a searching interface. Results are not given using pictures or images although the information would be much more valuable since it is not possible to explain in a short paragraph what a picture can show. When the user is doing a search within a conventional organizing system or even with Internet search engines, the user is usually beginning searching with specific words, topics, or file formats. This allows the user to isolate information elements that contain the searched words either in the title or in the file itself. It is similar with file format in that only file names of a specific format will be showed as a search result. Often, results will be presented by relevancy using a listing. Relevancy is based on arbitrary considerations depending on the search engine used. That kind of search fails to present search results where the related links with the information element are clearly shown.

With a prior art information managing system, the user must often meticulously store documents in numerous directories. Easily displaying all the elements linked and their sequence of entry is usually difficult. Furthermore, displaying all the elements of information linked by a combination of attributes to display all the linked elements in the order or sequence that they have been entered (it may, for instance, be useful to show a series of communications that have led to a final memo, or a series of reports that have led to a given professional decision) is also impractical. Conventional information managing systems are often time-consuming and include obstacles that prevent users from regularly maintaining, in a structured manner, significant quantities of information. For example, if a user wants to keep a "life long" information journal or logbook (like R. Buckminster Fuller's Chronofile for instance), the user cannot use prior art information organizing systems to record the information from his/her life. It is not possible for an individual to record and to file various information elements from multiple sources over a long period of time and hope that someone else will be able to understand quickly and efficiently the meaning of the information, the relationship between the information elements as well as the order in which the events occurred. Any sorting of these information would lead to the destruction of the only relation that exists between them.

In corporate environments, it is important that the "knowledge" of the enterprise remains usable, regardless of the employment status of the author. Additionally, it is also desirable that the data management methods used by employees be unified, both for efficiency, interchangeability and ease-of-training reasons. That is, a unified system enables the decision-making process to be more coherent. An efficient and coherent information managing system should also be an intricate part of a company quality assurance program.

Furthermore, companies that are engaged in extensive research and development generate substantial files and documents from several sources. As a result, these document-driven firms need a tool to efficiently track these documents. It can be useful to keep track of project history and the objective behind each stage of the project. By maintaining a detailed history, additional projects may be fostered and repetitive projects avoided. Adding to the need for efficient and organized document management is professional employee turnover. One example of an incentive for a structured file management structure is tax incentive. In some countries, research and development can be tax deductible. In order to have access to the R&D tax credit a company must prove the work was done. With prior art documents filing systems it represents an enormous task to find the information needed to make the proof. Knowledge tracking, recording, and interchangeability represent a constant challenge and a huge task that prior art systems cannot adequately accommodate.

Maintaining an address book and a calendar or agenda are usually considered by conventional information managing systems as separate tasks using separate software. These two relations to information are fundamental and should be included in a complete designed information managing system.

Prior art computer systems or computer interfaces have not provided solutions to deal with the aforementioned problems and each of these deficiencies in the prior art yield a demand for an improved information managing system and method using an intuitive and natural way to visually present information as well as the associations between the information. Other needs might become apparent for a person having skills in the art of information management in view of the present reading.

SUMMARY OF THE INVENTION

It is, therefore, desirable to provide a method and a system that organize information that is an improvement over known information organizing methods and systems and improves at least one of the aforementioned deficiencies.

Accordingly, one aspect of the present invention provides a unified method for graphically representing and organizing information elements regardless of the format, type, size, media or nature of the information, a computer system including a computer power unit, a memory, an input, an output, a display device and a plurality of information elements.

In accordance with another aspect of the present invention, at least one characterization attribute is associated with each information element. A characterization attribute can be described as a "category" or topics that characterizes the information element according to the meaning the information element has for the user. Because it is desirable to carry as much context as possible with every information element the invention also provides a tool to work with many characterization attributes for every information element.

One further aspect of the present invention is a vector of information elements. An information element vector is usually the representation of more than one information element in a particular order. Accordingly, this aspect of the present invention provides a first vector of information elements. The first vector generally includes information elements having at least one common characterization attribute. The ordering of information elements on a vector is made according to a desired aspect (i.e. time, statistics, memory size, last used, . . . ). When a vector is based on a timeline, the time scale of the timeline might be linear or non-linear.

According to another aspect of the present invention, the selection of at least one characterization attribute associated with at least one information element in a first vector (the characterization attribute can be the information element) generates a second information element vector including more than one, information elements. The second vector of information elements is presented on the display device at a different angle relative to the first vector while using the chosen information element of the first vector as an intersection point. The ability to simultaneously show a sequence of information elements as well as a sequence of linked information elements actually creates a bi-dimensional graphic interface. The first and/or the second information element vector is based on a timeline that has a time scale that might be linear or non-linear.

According to another aspect of the present invention, the generation of a second vector of information elements acts as a relational search presenting, in the same second information element vector, information elements that include at least one common characterization attribute. The second information element vector presents information elements in a way it is easy to ascertain which information element is following the other on a same topic or category associated by an information attribute. In addition, it is intuitive and easy for the user of the information system to follow the path of information elements using the information element vector in a two-dimensional space especially if the vectors are orthogonal to each other. An information element is illustratively an intersecting information element to indicate where the vectors relate one to another when at least one information element is commonly shared between both information element vectors. The vectors are evolving in the vectorial space that might be interpreted as a plan or a volume defined by the different vectors.

One aspect of the present invention provides a system that graphically represents on a display device the vectors containing a representation of information elements in a predetermined order so it is possible to perceive what information elements are surrounding a particular information element, what is before and what is after. The graphical representation brings a lot more information in a glimpse of an eye than conventional representations (i.e. listings). Furthermore, the user can switch from one information element to another following only the relation between them (i.e. characterization attributes). This is a much more efficient way to dispose information than to take information elements coming from multiple sources and trying to make links between them using the type of file or the location in the memory device of the computer system.

It is another aspect of the present invention to have a third information element vector which may represent the variation in time of a given information element. Variations can mean versions, annotations, and updates of a given information element.

Another aspect of the present invention provides a progressive zoom in and zoom out of the vectorial space. A user can then see only a part of one information element, one complete information element; or many information elements on one or more information elements vectors. The time scale of the timeline on which can appear information elements is changing from a linear time scale to a non-linear time scale, and vice-versa, in accordance with the strength of the zoom-in/zoom-out. The change between a linear and a non-linear time scale is made automatically by the system when a preset threshold is reached. A preferred threshold is selected by a user so the change is made whenever it is desired by the user.

Another object of the present invention provides a method for presenting a first plurality of information elements on a first information element vector on a display, the method comprising presenting the first plurality of information elements on the first information element vector along a first timeline on the display; and alternatively selecting a time scale of the first timeline between one of a uniform fashion and a non-uniform fashion.

Another object of the present invention provides a system for presenting a plurality of information elements along a first information element vector upon a display comprising a computing unit; at least one storage device electronically connected to the computing unit; computer-executable instructions stored at least in part on the at least one storage device; a plurality of information elements stored, at least in part, on the at least one storage device; a user selectable interface in operative communication with the computing unit; and a display in operative communication with the computing unit and adapted for presenting at least a portion of the plurality of information elements on a first information element vector along a first timeline on the display, the first timeline adapted to alternatively represent time in one of a uniform fashion and a non-uniform fashion.

An object of the present invention provides a method for organizing information elements in a system having a display device and being capable of manipulating a plurality of information elements, each one of the plurality of information elements having a least one characterization attribute, the method comprising generating a first information element vector based on the first characterization attribute, the first information element vector comprising a group of information elements having the first characterization attribute and being selected from the plurality of information elements; causing the display device to display a representation of the first information element vector at a position; determining a second characterization attribute based at least in part on an action performed on the first information element vector; generating a second information element vector based on the second characterization attribute, the second information element vector comprising a group of information elements having the second characterization attribute and being selected from the plurality of information elements; and causing the display device to display a representation of the second information element vector non-parallel to the position of the representation of the first information element vector, wherein the first and the second information element vectors are adapted to chronologically display their corresponding group of information elements according to a timeline selectively representing time in one of a uniform and a non-uniform fashion.

Another aspect of the present invention is that the information elements vectors are represented in a way it is possible for the user to use a game controller to "navigate" within the vectorial space. A game controller is usually used with gaming console to improve the user's experience and to maximize the abilities of the user to make many complex actions with a simple tool. The use of the game controller can be made in addition to the mouse, the keyboard or any other means for influencing the computer system and change the time scale when zooming-in/out information elements.

In one aspect of present invention, a theme can be applied to the vectorial space to improve the user experience. The theme helps to maximize the user's experience in using the vectorial space. The game theme uses the different information element vectors, the zooming effect, and the navigation capabilities of the system to transform information managing in an electronic game mean.

Another aspect of the present invention is to allow information elements of non-electronic format, such as a book or a paper note, be linked to the system. The system can provide a reference number linking the "hard" information to the system. Alternately, the physical document can be scanned and further inserted in the system. Both ways enable the user to consider "hard" information as well as digital information when using the system to retrieve information. This is an improvement since the user can deal with every kind of information in the same way.

It is an aspect of the present invention to integrate seamlessly the agenda, the email system and the address book of the user in the information system. The agenda and the address book are generally considered by prior art information managing systems as distinctive "tools" but they are, in fact, either or both information elements and characterization attributes to information elements.

Another aspect of the present invention is to offer at least three interconnected main vector types: personal, professional, and corporate. Then, if the user needs to, those vectors can be isolated so only one of them can be shared thereby keeping the others secured. It may also be possible that access to the users information, restricted or not, be given to other parties, or to the user from a remote location.

According to another aspect of the present invention, every information element has a number. The number is, most of the time, given accordingly to the entry order. Since the information element format is standardized in the system, the user can intuitively consider the number as a "page" number so it is easy to refer to a particular information element. Complex page numbers are also utilized to identify an information element on more than one vector. Complex page numbers can also be utilized to add more information to an information element page number. The number is also used as a hyperlink inside the system. That way it is possible to link information elements between them so it becomes possible to access directly an information element from another inside the vectorial space.

Another important aspect of the present invention is to provide a plug-in mean to a conventional web browser (i.e. Internet Explorer™, Netscape™, FireFox™ or Safari™). The multi-dimensional plug-in provides the conventional web browser the capacity to navigate inside the vectorial space and change the time scale about which the information element vectors are displayed. This could lead to another aspect of the present invention providing a web-based system.

Another aspect of the present invention is to provide a direct way to produce an Internet web site. The information element to be included in the web site can be selected choosing the appropriate characterization attribute. This would lead to an easy to build "multi-dimensional" website.

These and other advantages and features of the present invention will become apparent from the following description and the attached drawings.

BRIEF DESCRIPTION OF THE DRAWINGS

FIG. 1 is a block-diagram of the sources of information leading to knowledge growth;

FIG. 2 depicts a schematic representation of the growth of an individual's knowledge in time;

FIG. 3 depicts a schematic representation of multiple individual's vectors in time;

FIG. 4 depicts a schematic representation of parallel vectors of individuals in time and the contacts leading to the exchange of information between them;

FIG. 5 depicts a schematic representation of the "bicephal" (personal/professional) aspect of an individual's path in time;

FIG. 6 is a block-diagram of an integrated hardware and software computer system;

FIG. 7 is a block-diagram of a filing process controlled by the SMLOI;

FIG. 8 is a block-diagram of the multiple unique filing process controlled by a prior art operating system;

FIG. 9 is a block-diagram depicting the multiple-link part of the filing process controlled by the SMLOI;

FIG. 10 is a block-diagram depicting the information insertion levels in the SMLOI;

FIG. 11 depicts the notions of information's layer, version and assembly in the SMLOI;

FIG. 12 depicts one SMLOI information element;

FIG. 13a depicts an information element with a date and time counter;

FIG. 13b depicts a unified format representation of an information element;

FIG. 14 depicts a more detailed view of the characterization attribute window from the attribute sub-area in the SMLOI;

FIG. 15 depicts a SMLOI information element illustratively having a unified format representation of an audio document;

FIG. 16 depicts an alternate dynamic assembly of an audio unified format representation document in the SMLOI;

FIG. 17 depicts a SMLOI information element illustratively having a unified format representation of a video document;

FIG. 18 depicts an alternate dynamic assembly of a unified format representation video document;

FIG. 19b depicts an alternative unified format representation of the document of FIG. 19a;

FIG. 29 depicts a tri-dimensional view of three information element vectors in the SMLOI;

FIG. 30 depicts a tri-dimensional view of three information element vectors in addition to a fourth vector in the SMLOI;

FIG. 31 depicts the second relative information element vector possibilities according to the fourth vector;

FIG. 32 depicts a typical corporate bloc diagram;

FIG. 33 depicts an alternative SMLOI illustratively applied to a multi-user corporate environment;

FIG. 34 depicts an access grid from a SMLOI in a multi-user corporate environment;

FIG. 35 depicts an alternative SMLOI in a multi-user corporate environment;

FIG. 36 depicts an alternative SMLOI access bloc diagram for a typical corporate environment;

DESCRIPTION OF EMBODIMENT(S) OF THE INVENTION

Figure 19A:
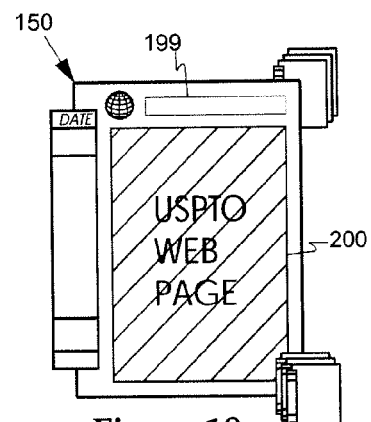
FIG. 19a depicts a unified format representation of an Internet sourced document.

A System and Method for Locating and Organizing Information (SMLOI) illustratively stored in the memory of a computer system will now be described in detail. The following description, specific steps, procedures, method, commands, graphic representation, computer user interface and other specifics are set forth in order to provide a thorough understanding of the present invention. However, it will be apparent to one skilled in the art that the present description of the invention provides only one example of how someone skilled in the art can produce the claimed invention. It will also be apparent to one skilled in the art that the present invention may be practiced without or with only a portion of the specific details disclosed herein. In other instances, well known systems and methods are shown in schematic and diagrammatic form or not shown at all in order not to obscure with unnecessary details the present invention.

The "Vector" Knowledge Theory

In order to build a good knowledge management system it is necessary to analyze how knowledge is acquired and how it is processed by a human being. A model was created to help understand how people are managing information and knowledge.

To improve the efficiency of knowledge management, the usefulness of the knowledge should be increased. If the knowledge is defined as the sum of the information retained, it can be said that the increase in efficiency of knowledge management can be attained by improving the usefulness of the retained information. The usefulness of the information lies in its ability to be understood, recorded, classified, visualized, anticipated, retrieved, extracted and shared.

FIG. 1 illustrates how someone's knowledge level 10 increases. Information is acquired through contact 14 with other individuals or learned 12. The learned information 12 can be provided by actions 16 and events 18. FIG. 1 illustrates also that information acquired through contact 14 with other individuals can come from meetings or minutes 20, messages or conversations 22, and documents 24.

The information gathering process is continuous for an individual. FIG. 2 shows the path of an individual, schematized by a cylindrical shape 30, relative to the absolute time vector 32, as being a continuous gathering of information. The cylindrical shape 30 is a schematized vector and will be explained in details later in this description. The gathering process is illustratively operating through actions "a" 34, contacts "c" 36 and events "e" 38 for the purpose of this description. The amount of the knowledge or information is represented by the cross area 40 of the cylindrical shape 30, and, as information is acquired through time 32, the knowledge is increased, hence, diameter $D_2$ 44>diameter $D_1$ 46.

FIG. 3 shows three cylindrical shapes 30 that represent the continuous, parallel paths of three different individuals 50, 52, and 54, respectively, relative to time 32. Interaction 72 occurs between individuals 50, 52, and 54 at time point 56 on the absolute time vector 32 over a period of time.

FIG. 4 shows the continuous, parallel path of individuals 50, 52, 54, 60, 62, 64, and 66, respectively, relative to time 32. Interaction 76 occurs between individuals 64 and 66 at time point 68, interaction 74 occurs between individuals 50 and 60 at time point 70, and interaction 72 occurs between individuals 50, 52 and 54 at time point 56. At interactions 72, 74, and 76 the contacts are likely to generate an exchange of information. The information can be of a personnel or a professional nature. For example, if individuals 50, 52, and 54 are employees of the same company their professional information transmitted during event 72 at time point 56 may be labeled as corporate.

FIG. 5 shows the path of individual 50, 52, 54 and 60 with one professional interaction 72 at time point 56 and one personal interaction 74 at time point 70. Personal interaction 74 is labeled and considered differently than a professional interaction 72.

The cylinder 30 diameter variation, as shown in FIGS. 2 to 5, represents the amount of knowledge 10 acquired by an individual. Equations and algorithms can be applied to that cylindrical representation 30 of the increasing diameter 46. Some of the variables may be the time vector 32, the cross area 40 of the cylinder 30, the time between contacts, the number of individuals, the nature of contacts, the diameter variation rate, the contact rate, the event rate, and the communication rate.

Accordingly, this theory, as schematized by this model, considers the time as a major reference in the knowledge gathering process of an individual. Other references, maybe less intuitive, will be listed later and are within the scope of the present invention. Different interactions between individuals generate information exchange. Further in the description it will be useful to understand that the schematized cylindrical shape 30 is a vector, further described as 230 and 232, in the SMLOI.

The Computer System

The System and Method for Locating and Organizing Information (SMLOI) of the present invention is part of a computer system such as the one shown in FIG. 6. The computer system shown in FIG. 6 is a complicated one, it could have been described only by an input/output interface unit, a system bus or network, a storage device and a processor. The type of computer system presented in FIG. 6, that is well known by one skilled in the art, includes a processing means, such as a microprocessor, a memory mean 84, such as system RAM, and a storage means that can be network based, such as a hard disk or other storage means having a high capacity for storing documents and other information maintained by the filing system. The processing means 82, the memory means 84, and the storage means 86 (which may have its own I/O controller 88) are interconnected by a system bus 90 which includes control signals as well as address lines and data lines for sharing information, including data and instructions, between the components of the computer system. Also connected to the system bus 90 is an I/O controller 92 which controls the signals received from a keyboard 94, a mouse 96, an image capture device 100, a touch screen (not shown), a microphone 102, and a game control 98 and provide those signals, which indicate instructions from the user, to the computer system. A display controller 104 is coupled to the system bus 90 and receives commands and data from the processing means 82 and from the memory means 84 via system bus 90. Display controller/adapter 104 controls a display device 106 in order to provide images for the user. It will be appreciated that the typical computer system includes a bit mapped screen stored in memory, which may be a dedicated frame buffer memory 105 or the system memory. As shown in FIG. 6, a display means 106 displays on a display screen 108 a cursor 110, which is controlled by the pointing device 96. The display means 106 may be any one of a variety of known display systems, such as a video (CRT) display monitor or a liquid crystal display. Future display devices such as E-paper, rolled screen and other display devices such as direct retina projection, direct brain stimulation means, and means for 3D representation are also considered as appropriate display devices. The SMLOI can also use a gaming console, a portable data assistant (PDA), a portable digital music player or a wireless phone as a computer system.

The pointing device 110 of the present invention may be substantially identical to the cursor control means shown in U.S. Pat. No. Reissue 32,632. However, it will be understood by those skilled in the art that many other types of cursor control means may be utilized, such as graphic tablets, keyboard, touch tablets, trackballs, pen input mechanisms, touch screens, game controller for game console, etc. Indeed, any device capable of indicating x-y locations and capable of controlling a cursor on a display means of the computerized system may be utilized in the present SMLOI as a pointing device. This includes the "target point" illustratively located in the center of the display means in action video games.

The pointing device, such as a mouse 96 will often include a signal generation means that typically includes a switch connected to a button 97. A user presses the button 97 to send one signal to the computer and releases the button to send another signal to the computer. Other signal generation means, as is well known in the art, may be used such as using certain keys on a keyboard 94 or using a pen input device which positions a cursor and, by pressing the pen's tip against the display screen, selects the item pointed to/pressed at on the display screen.

Other kind of devices can be utilized as pointing devices and can also work to indicate x-y and x-y-z locations if the display device allows the user to perceive a third dimension. Game pad, tactile glove, voice activation and other kind of pointing devices means are considered as appropriate pointing devices and are within the scope of the present invention.

Entering a document, which can be any kind of digitized information, can be made in more than one way, through at least one action on the computer system. One way is as the user is working on a document through an application software to click on the designated SMLOI icon located in typical windows-like operating system in the "task bar" or "status bar". One alternate way in a typical windows-like operating system is to drag a document (opened or not) on the SMLOI icon on the "desktop" and drop it. One other alternate way is for the user to consider his/her SMLOI as a printer, and do a print-to-the-SMLOI command. One other alternative way could be for the user to consider his/her SMLOI as a drive, and do a save-under-the-SMLOI command. The SMLOI icon can sit in the "dock" in an Apple-computer-like environment. The SMLOI can also have embedded functions in other applications that automatically achieve the same actions or tasks.

In the SMLOI, the management of the computer memory space allocation can be handled by the SMLOI. FIG. 7 shows a block-diagram of such a handling from the SMLOI. The document 102 is linked to the characteristics (or attributes) 117 and stored 109 under the SMLOI. The SMLOI can generate a standard file 114 on the storage means 86. The SMLOI could provide the added benefit of automatically encoding and/or encrypting all files and illustratively generate a unique or multiple ".SMLOI" type files 115 making their access without the SMLOI impossible, thus increasing security.

All existing documents or other data in a computer system directory can be entered in the SMLOI as the SMLOI is installed on the computer. All existing files found on different memory devices and storage devices such as a floppy disk, a hard drive, magnetic tape, optical drive, RAM, Flash memory, DVD, CD-ROM, USB key or other memory support can be entered as SMLOI elements as a result of a single enter-in-SMLOI command. All incoming e-mails and their attached files can be entered in the SMLOI as a result of the choice of such a default mode in the SMLOI setup options. It is understood all technologies available for wireless data transfer are encompassed by the present invention. Illustratively, the information elements, the axis, the files associated with the information elements and all other data related to the SMLOI can be wirelessly transferred using Wi-Fi networks, cellular phone lines, microwaves, AM and FM band, satellites-based networks and other means for transferring data without physical wires.

The SMLOI reduces the number of times a document file has to be saved in the computer memory means. FIG. 8 shows a block-diagram of a prior art system, where a document 112 gets linked to four different subjects or topics, namely A, B, C and D. This is accomplished by filing copies of the document into four different directories 120, occupying four locations 121 in the computer's memory and four times the memory space. FIG. 9 presents a block-diagram of the SMLOI where a document 112 is singly stored in the computer's memory (through the operating system (OS) or SMLOI) and entered in the SMLOI. The document is then attributed related attributes/characteristics. The only memory spaces occupied are then for the document itself 124, and its SMLOI-only information 126, respectively.

FIG. 10 shows a block-diagram of the system levels. Level zero corresponds to the level without the SMLOI. Level one 130 is attained through installation of the SMLOI. Level one 130 allows the SMLOI to record a document with minimum interaction with the user. Level one 130 considers the primary insertion 133 as a "drag and drop" like means action from the user. The SMLOI automatically records the information linked to the document 112 such as (but not limited to) the file format 135, the time the insertion in the SMLOI was made, and the size of the file. These characteristics are considered as intrinsic characteristics 136 because they only ask for the insertion action from the user.

Level two 131, as presented on FIG. 10, is the same as level one 130 with the addition of extrinsic characteristics 138. Extrinsic attributes/characteristics 138 correspond to the information known by the user that helps with understanding the meaning and the relation of the document 112, to that which it relates, and all other information that can assist with understanding the value of the document 112. Simply, each document has its own unique extrinsic attributes/characteristics. The addition of the extrinsic attributes/characteristics requires more actions from the user. As such, level two 131 is considered a secondary insertion 140 because it can be done at a different time from the primary insertion 133 in the SMLOI. Level two 131 also allows the user to modify intrinsic characteristics 141. Level one 130 and level two 131 do not alter the document in the SMLOI itself.

Level three 132 brings the user to a level where the document may be modified in the SMLOI. Annotations 142 can be made by the user in order to add more meaning to the document already entered in the SMLOI. The annotation, namely a layer 143, can be considered as a distinct document. FIG. 11 shows an annotation 142 on which the user can chose to merge 146 the layer 143 so it will become an assembly 144. An assembly 144 is an independent document. Actions on documents through application software can be monitored by the SMLOI and altered documents being saved and entered automatically as new annotations in the SMLOI as a level one 130 insertion.

If source file associated to an information element in an axis of the SMLOI is moved to another location the SMLOI follows the movement of the source file and automatically creates a link between the new location and the information element to which the source file relates to keep the SMLOI's database up to date.

In order to increase the efficiency of the SMLOI, computer peripherals that are well known in the art such as printers, scanners, or safety systems such as the ones used for biometrics recognition of the user can be under direct control of the SMLOI. The SMLOI can also rely on the operating system (OS) to accomplish these tasks. To further increase the efficiency of the SMLOI without requiring too much of the user, links between the SMLOI and certain application software for functions such as e-mail, agenda/schedule or network access may also be provided.

In order to capture ongoing audio stream media or video stream media, a memory buffer allows the user to constantly record information so the user can keep information before he/she gives the recording order. The memory buffer continuously records the streaming media that was seen and/or heard by the user. The buffer has a user's specified time length and eliminates old data to record new data unless the user has instructed the system to keep what has been recorder in the memory. Useful data is then kept in another memory location for further consultation.

The Information Element

Each document, music album, music track, picture, code, voice mail, e-mail, copy of a webpage, E-book, video and other formats of information managed by the SMLOI is called an "information element" and is referred to as types of information. Most of them are files one can save on a computer's memory. Illustratively, a file containing a single music track (illustratively data type 1) could be juxtaposed in the SMLOI to a PDF document (illustratively data type 2), then a complete music album (illustratively data type 3) and followed by a text document (illustratively data type 4). A document, any information, or any other kind of data recorded in the SMLOI is illustratively represented using a "unified format". Even if a "unified format" is desirable the SMLOI is not limited to use a "unified format". Many different formats can cooperate in the SMLOI, each having its own visual appearances. One of the goals of a unified format is to provide an easy and constant manner of presenting various documents or data, using the same pattern. An information element can also be created by direct writing by the user inside the SMLOI using any mean like a keyboard, a touch screen, voice or image recordation or a pen-pointing device. An information element generally presents an image of the information, the multiple characteristics linked to the inserted document, and other information related to document and to the SMLOI. The information element presents either an image of the document or the real document itself. The user can access the real document using the application program on the computer system directly through its information element.

Each information element is composed by a document and by "areas". The "areas" are presenting, in a standardized manner, the information related to the document in order to give the user an instantaneous overview of what is related to a given document. The areas are distinct for every information element and are illustratively superposed on the related document thus providing an intuitive graphical assembly while letting the underneath document image appear in order to allow the user to see the complete document. The areas are also utilized to manipulate the SMLOI functionalities and are considered as a specific interface for each information element in the SMLOI. The SMLOI then provides a global interface acting on many information elements and multiple specific interfaces respectively acting on their associated information element.

FIG. 12 shows a complete information element 150 with its proposed unified representation. The information element's image 154 is completed by an information area 156, an anterior assemblies area 158, an intra-document multi-page area 160 and an ulterior assemblies information area 162. Alternatively, the anterior and ulterior assemblies information areas can be located at the information element bottom 163.

The information area 156 is itself divided between a date of entry sub-area 165, an event-task-action sub-area 166, a information element characterization attributes sub-area 167, a hyperlink sub-area 168 and an entry sequence number sub-area 169. The information area 156 as presented by FIG. 12 is partially superposed on the document so it is easy to see which area is related to a specific document.

The date of entry sub-area 165 indicates the moment where the information element was inserted in the SMLOI. Generally the user keeps the entry date generated automatically by the SMLOI but it is possible for the user to voluntarily modify the date of entry. The date of entry can be modified if the user wants the information element to appear in the SMLOI at a different sequential order. If the date of entry is modified, the original date of entry is preferably kept by the SMLOI. The information element that has multiple dates of entry can be seen at multiple places in the sequential order of the SMLOI.

FIG. 12 shows the event-task-action sub-area 166. This sub-area has the specific role to provide all kind of time-related information to the SMLOI user. Time-related information includes meetings, tasks, alarms, status (in force, expired or pending in the case of a patent document), reminders, or the like. Icons and text are mixed to give a visual effect in addition to sounds that attract the user's attention. The background color of the event-task-action sub-area can change to give the user further visual indications. For instance, green could mean that everything related to that information element is completed, while yellow could mean that something is currently ongoing and red that something is late or past-due. Flashing background color may also have a specific meaning. Selection of this sub-area 166 or selection of the text/icon using the pointing device acts on specific functions as the creation or the modification of a task, an event, or an alarm. The information contained in this sub-area may also generate a to-do list or be fully integrated with the agenda. The colors or other indications related to the event-task-action sub-area 166 can be used to, illustratively, completely fill the information element to provide a high level view of the status of any time related information noted above. These information-elements-presenting-reduced-content are helpful to abstract a portion of the content to focus the attention of the SMLOI user to some more important meaning carried by the information elements.

The characterization attributes sub-area 167 as shown in FIG. 12 presents intrinsic (metadata) and extrinsic characteristics that provide the relationship meaning related to each information element according to the SMLOI user. Each information element and each characterization attribute have their own distinct meaning (i.e. either the information element or the characterization attribute, when taken separately, means something). The characterization attributes can be categories, information element types, status, specific sequences illustratively according to time of entry in the SMLOI, last time printed, last time read, last time selected, alphabetical order, types of songs, length of songs or statistic results; it is in fact any means that gives order or additional meaning to contextualize the information elements. The user can have its own characterization attributes and can have characterization attributes that are shared by a group of SMLOI users. Each characterization attribute selected by the user to be linked with the information element will be presented in this sub-area 167. The visual presentation of each characterization attribute will preferably be in the form of a button or an icon so the SMLOI user can easily select anyone of them individually or in group with the pointing device. No characterization attribute can appear associated with a information element meaning there is only one information attribute associated (or selectable by the user). In this case, selection of the information element itself has the effect of selecting the only characterization attribute. The later action will allow the user to generate relative vectors that will be further explained in this description. The visual aspect of the selected characterization attributes will change so the user will easily know which characterization attribute has been selected. The background color of the sub-area 167 can change to give the user further visual indications. The order in which the characterization attributes are presented in the sub-area is set according to the user preferences. Statistical organization of attributes can be performed by the SMLOI. Favorite or "most often used attribute" can remain, to the user's preference, on top of the list. Alphabetical ordering of the attributes is also possible. Automatic creation of attributes cluster according to occurrence statistical order or any desired relationship can be performed by the SMLOI. The user can be offered first the attributes he is the most likely to select.

The hyperlink sub-area 168 as shown in FIG. 12 contains external hyperlinks and internal hyperlinks. External hyperlinks are generally of two types, internet related hyperlinks and other users' SMLOI direct access. Internal hyperlinks are generally direct links to other information elements in the SMLOI of the same user. This has the purpose to give direct access to the information element references so the user can have a quick overview of the links to the information element he or she is visualizing.

The entry sequence number sub-area 169 as shown in FIG. 12 presents a sequential number that indicates the sequence in which the information elements are entered in the SMLOI. The entry sequence number helps the user to have an intuitive way of classifying the information element. The entry sequence numbers are hyperlinks in the SMLOI so it is possible for the user to use them to draw quick access path between different information elements in the SMLOI. The entry sequence number can be used as hyperlinks between multiple distinct SMLOI thereby giving direct access to other users information elements using the same intuitive method; although, when a user has another user entry sequence number in its SMLOI, this entry sequence number will be preceded by the other SMLOI user number.

FIG. 12 also shows the anterior assemblies area 158. This area gives the user a direct view of the anterior assemblies, versions, or annotations of the visualized information element according to the time vector 32. The user can directly access another information element assembly by selecting the desired assembly in the anterior assemblies area 158.

FIG. 12 shows the ulterior assemblies area 162. This area gives the user a direct view of the ulterior assemblies, versions, or annotations of the visualized information element according to the time vector 32. The user can directly access another information element assembly by selecting the desired assembly in the ulterior assemblies area 162.

FIG. 12 also presents an alternate way for presenting the anterior and ulterior assemblies. The alternate anterior and ulterior assembly area 163 presents various assemblies, versions, or annotations, according to the time vector 32. The current information element 150, in FIG. 12, is also presented in the anterior and ulterior assembly area 163 as the assembly at location 170. Variation in the size of the presented assembly helps the user to perceive the closest assembly from the currently visualized information element 150, 170.

The multi-pages document area 160 as shown by FIG. 12 presents to the user a few other pages from the information element 150 if the information element 150 includes more than one page. If the information element 150 includes for instance 5 pages, the multi-pages document area 160 will present the four that are not shown in the document image 154. The user can select them if he or she wants to have a bigger picture of the desired page. If the number of pages is larger than the space available arrows 171, 172 will indicate that there is more pages to see so the user can scroll up or down to visualize them.

FIG. 13*a* presents an information element 150 with its information area 156. The date of entry area 165 generated by the SMLOI is applied to the information element in FIG. 13*b*. The date the information element is entered in the SMLOI can be seen in its date of entry area 165. The background color of the date of entry area can change to give the user further visual indications. Selection of this sub-area using the pointing device acts on specific functions.

When the user inserts a document in the SMLOI he or she can select the appropriate characterization attributes. FIG. 14 presents a means to select the appropriate characterization attributes for an information element 150. Entry window 174 is used for the display of the intrinsic and extrinsic characterization attributes. FIG. 14 also presents, for instance, only extrinsic characterization attributes. When the user clicks on the characterization attribute sub-area 167, the information element characterization entry window 174 opens, allowing the user to add, modify, or delete information element characterization attributes while getting access to his/her list of "favorites" characterization attributes. The user can either type in a new 176 characterization attribute or click on the proposed attribute or click on the arrow to have the characterization attribute list appear on a specific topic. Picking one with a pointing device from the list will make it appear with a button in the characterization attribute sub-area. To increase the first-glance impact, symbols and colors are added to the characterization attribute sub-area 167 as well.

In the event of a subsequent alteration of these characterization attributes, a trace can be kept of both the change details and the original information. Not all extrinsic characteristic attributes need to be typed in each time. That is, user should be able to build his/her list of favorites, and to select from it. The most frequently characterization attribute can be displayed automatically at the top of the list by the SMLOI. The user is also able to link an information element to a task he or she has to perform or to an event, such as a meeting minutes being linked to the agenda. These are statutory characterization attributes.

The SMLOI provides a unified format for audio and video documents. FIG. 15 shows an information element 150 that is a unified format representation of an audio document with its title 180, duration 181, and audio symbol 182.

FIG. 16 shows a dynamic layer over the unified format representation of an audio document. The title 180 and symbol 182 are part of the basic audio information element 150. Dialog box 185 is part of the layer and allows the commentaries to be displayed/sounded as the basic audio information element is displayed. The display bar 187 gives an idea to the SMLOI user on the position of the audio listening. The position indicator 189 moves from left to right as the video document is played in typical media player fashion; using the pointing device, the user can drag this position indicator 189 to the left or the right, and resume listening to the document at another point. The musical symbol 190 in FIG. 16 is the indicator of additional audio comments added to a layer over the audio information element 150. The triangular symbol 192 is (for instance) an indicator of a written comment added to a layer over the audio document and shown at a specific time. The camera symbol 194 is an indicator of a video comment added to a layer over the audio document. A duration indicator shows up when the user points the pointing device to one of the comment indicators and displays in the window 185 the time at which the comment has been inserted over the total duration of the original information element.

In FIG. 16 are buttons 194 typical of media player and are pause, stop, play, fast reverse, and fast forward, respectively, and are, in addition, commands for the displaying/activating the comments. Comment window 185 shows the written and video comments as their insertion point is reached while the document is played or as the user clicks on the related indicator. If so desired by the user, the document can be automatically stopped from playing momentarily as comments 192, 195 and 190 are "reached".

FIG. 17 shows an information element 150 that is a unified format representation of a video document with its title 180, duration 181, video symbol 196 and projection window 198 that is used for displaying the video information element 150 of FIG. 17. FIG. 18 shows an assembly built from the addition of a dynamic layer over the unified format representation of a video document. The title 180 and symbol 196 are part of the basic information element and are visible through the clear substrate of the layer. The functions are generally the same as the ones presented previously for an audio document in FIG. 16

Figure 19B:
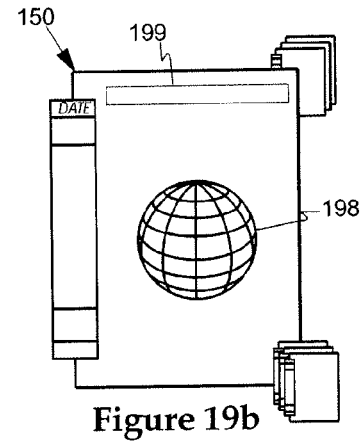

FIG. 19*a* shows an information element where image 200 is the actual picture of a web page as an information element in the SMLOI. The user may either copy information as presented by FIG. 19*a* into the SMLOI or just writes a hyperlink to reach the information as in FIG. 19*b*. FIG. 19*b* shows an alternative representation of the same element with only the symbol 198 on the center of the page and the web address (URL) 199.

Numerous software applications are available to help users keep track of their schedules and of the tasks they need to accomplish. The tasks of the user can be displayed as information elements in the SMLOI, and be graphically recognizable within the SMLOI. Tasks as information elements can be associated with related sub-space (item 166 in FIG. 12) and linked to appropriate characterization attributes. Color and other types of coding are part of the unified format representation of such an information element to graphically inform the user of the status of a given task as previously described. The appropriate sub-area will display codes related to the task as well as the due date characterization attribute. Events from the agenda (such as meeting) or not (such as voice messages or conversations) can be displayed as information elements, and be graphically recognized as such within the SMLOI. Details of the event such as date, time or location are accessible directly form the information element. The user can graphically visualize linked tasks (such as preparation for meeting or an action resulting from a voice mail) as well as linked information element (such as a list of documents he or she may need to recover to go to a given meeting). The user is able to visualize linked tasks graphically, as well as linked elements of information (such as a list of document he or she may need to recover as part of the task). The user can create work lists, prioritized or not, from the tasks inserted in the SMLOI.

Information elements can be linked to individuals (such as a list of participants present at a meeting where a given report has been distributed). Such a link can be established by 1)

entering the event as an information element, with its participants as characterization attributes as well as indicating another element (the report) as an hyperlink and 2) by asking on that information element or on the areas of the information element to visualize the linked elements, which would then show the event among other information elements on the relative representation vector, which means the second dimension that will be explained later in details.

For an information element of an event entered in the SMLOI, the statutory sub-area would become the event sub-area by displaying codes such as "preparatory task to be done", "past event" or "event to come", etc. . . . . . A direct link to another information element can be included in the characterization attribute sub-area or in the hyperlink sub-area.

Figure 20:
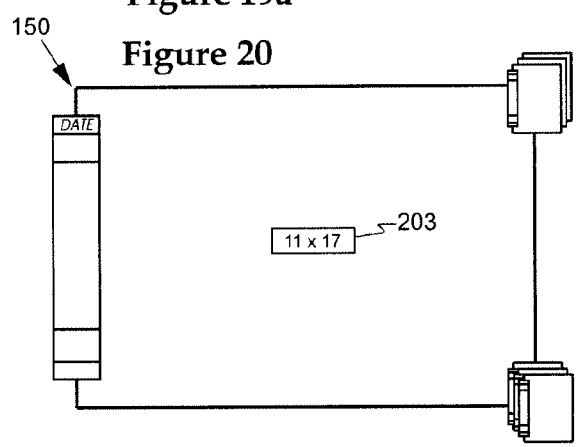
FIG. 20 depicts an unified format representation of an odd-sized document.
Figure 21:
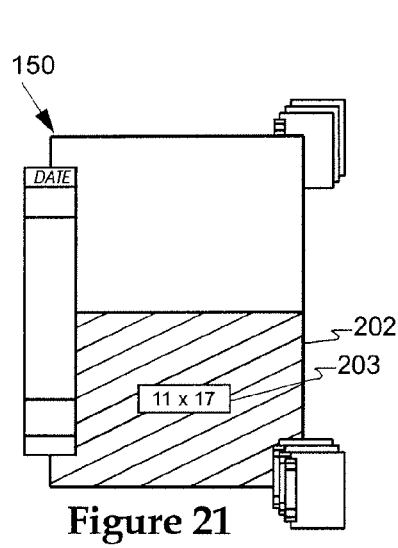
FIG. 21 depicts an unified format representation of an odd-sized document resized in a standard SMLOI information element size.

The SMLOI can display documents that were meant to be printed on paper formats different than the user-specified default format ("letter" or "A4" paper size for example). FIG. 20 shows an example of such an odd-sized document, where the proportions of the image are similar to the ones of the real document. Such an approach could, however, prove to be rather inconvenient if more than one element is to be viewed at the same time. It then may be desirable that all the information elements be displayed within a common-size "sheet size". FIG. 21 shows such an arrangement, where the image 202 of the document and a label 203 indicates the true size of the document. The information element "envelope" would then always be the same for "letter" paper size proportions.

Figure 22:
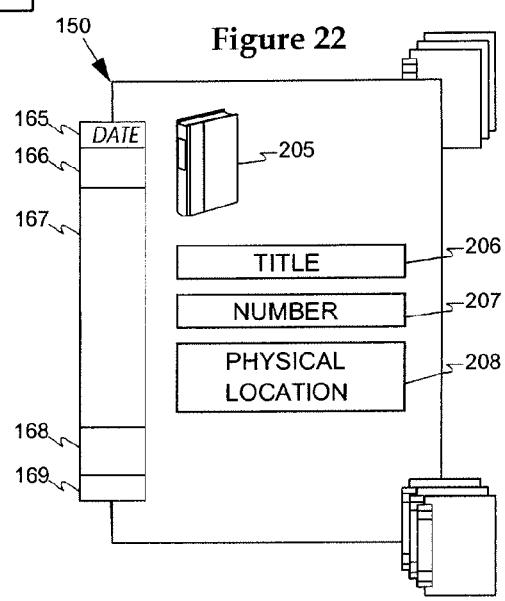
FIG. 22 depicts an unified format representation of a reference to a non-electronic document.

The user can keep track, via his/her SMLOI, of all of his/her information elements, even if they are not under an electronic format. A numbering system for those external reference materials may be created and a short comment for each may be written. FIG. 22 shows a unified format representation for an information element linked to an external reference material where a symbol 205 used to designate such external reference material. A title 206 given to the document by the user, a label 207 showing the number of the document as per the user's numbering system, and the location 208 where the actual document is physically kept may also be implemented.

Some information elements collected by a user can be made available for viewing by others as a means to stimulate creativity. For instance, interesting articles could be sent to a "pool" and available for browsing by other SMLOI users or be sent one at a time at a specific rate through e-mail to selected SMLOI users. A user may also choose to have old clippings sent to him/herself after a certain delay to refresh his/her own memory. Random order element visualization is also an option. Such elements could be sent through e-mails or be used as the "desktop wallpaper of the day", the "screen-saver of the day", or even be displayed in SMLOI as "publicity stripes".

The SMLOI user can select the "SMLOI web site" attribute. By doing so, the user may build a "SMLOI web site" with the selected information element. The user website will present the selected information elements in a web page for others to visualize the information elements on the Internet using an SMLOI browser "plug-in". This way, the SMLOI user can share to everyone on the internet the selected information elements without any complicated task. The other SMLOI functions that will be further described are also enabled within a browser plug-in.

The SMLOI includes a "collection tool" allowing for easy gathering and organizing of a series of information elements. Options for display are also offered to the user such as a formal portfolio, scrap book, logbook, notebook, or slide show. These collections may be sent to other SMLOI users, not as memory-consuming-bunch of files, but rather as a list of links and punctual access rights.

The SMLOI has an enabled collection process. For instance, five elements are selected by the SMLOI user who then creates a collection therefrom. The collection then becomes an element which, among its attributes, has the intrinsic characterization attribute "collection" and is inserted in the SMLOI. The user can then use the collection in many ways. For example, the user may send access rights to another user or do a full or partial print of the information elements. The user could also visualize or print a list of the information elements contained in the collection or create a slide show of the information elements that could be sent or become presentation material.

It may also be desirable for the SMLOI to narrow the gap between the electronic data management and the more traditional handwritten information. This may be accomplished with the SMLOI through the integration of handwriting recognition, applicable software, and electronic signature capability. This may also be accomplished by integrating in the SMLOI the capability of generating encoded note-taking material and properly filing the digitized hand written material. A purpose-printed note paper (or template) may also be generated by the SMLOI and printed. The template is then used as normal paper for taking notes and is scanned for its insertion in the SMLOI. During the scanning process, the SMLOI recognizes identification marks on the template (such as a printed bar code or a hand filled boxes) and assigns intrinsic attributes accordingly as it creates a new information element in the SMLOI.

The Multi Dimensional Representation

Figure 23:
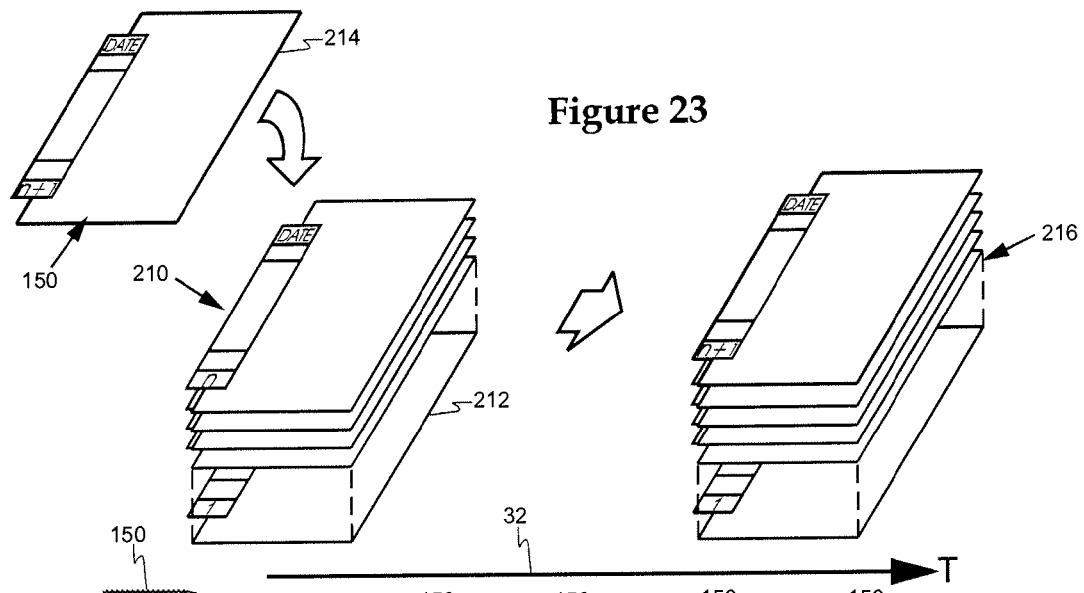
FIG. 23 depicts a SMLOI basic entry sequencing applied to an unified format representation of a document as it is inserted in the SMLOI.

In order for a user to keep track of the sequence in which the information elements are related to each other, the SMLOI provides a way to keep specific sequences between information elements. One means of establishing such a sequence is by representing the entry of an information element. The SMLOI is also providing an entry sequence number to keep the information elements in the order that they have been entered. FIG. 23 shows an element 150 that is added to a pile of elements 210 where the entry sequential number for the first element 212 entered has number one and the last, "n". The new element 214 added then gets the sequential entry number "n+1".

Figure 24:
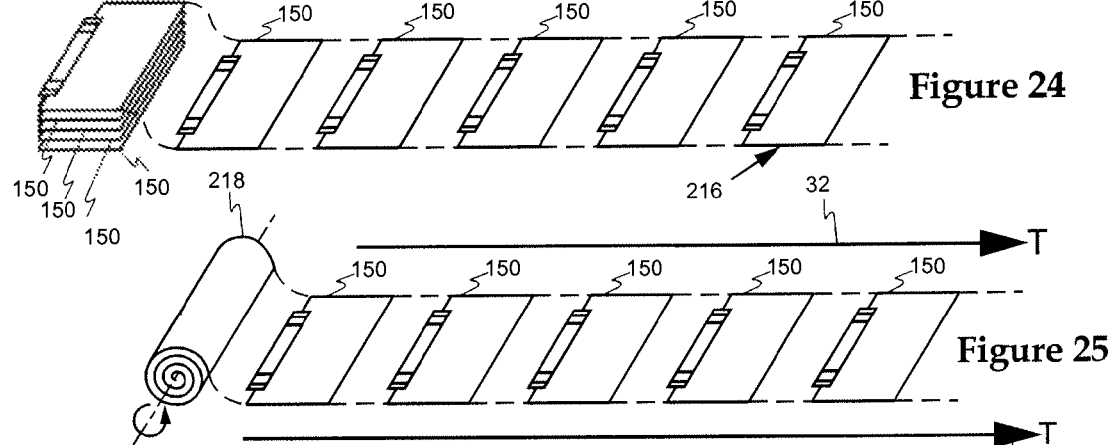
FIG. 24 depicts an alternative "pile" methods of graphically representing the information element order in the SMLOI.
Figure 25:
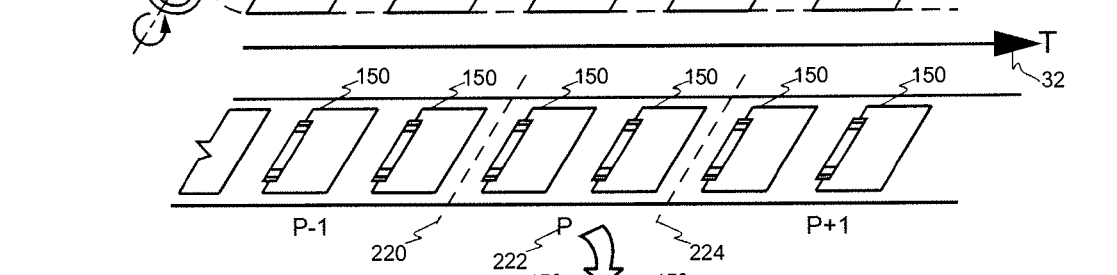
FIG. 25 depicts an alternative "roll" method of graphically representing the information element order in the SMLOI.

The invention provides a way to see part of a sequence through preceding and following information elements. For example, FIG. 24 illustrates that the information elements 150 are placed side by side and in the order that they had been entered. The last information element added to the sequence would be the one at the extreme right 216 according to the time vector 32. FIG. 25 shows another way of viewing the sequence. The information elements 150 are placed side by side and are rolled in that order on a roll 218 still according to the time vector 32.

The time vector 32 usually represents the absolute chronological order that is applied on information element vectors whether they are including all the information elements 150 or only a portion of them. Absolute information element vectors and relative information element vectors are then linked to a time vector 32. The time vector 32 sequence can be replaced by a specific sequence vector that is not necessarily related to time. In that order, only the sequential aspect of the time vector 32 would be kept and applied with some other consideration, like statistical considerations, to a specific sequence. Hence, an information element vector can be related to the number of times an information element has been selected. That is, the information element vector 32 presents the information elements in a incremental order. The information element vector 32 can also be generated ascendingly or descendingly considering the memory size of the information elements 150. The information element vector may also present the information elements 150 based on the number of characterization attributes 178 applied to each information element.

The spreading-the-information-elements exercise, shown on FIG. 24 and FIG. 25, directionally towards the right may also be done in any direction. The display of the information elements in such a manner creates an information element vector allowing the user to visualize the information elements 150 entered as well as the absolute sequence into which entry has been done.

Figure 26:
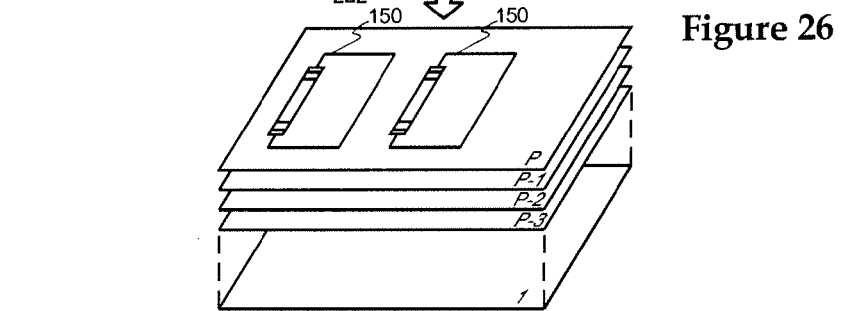
FIG. 26 depicts the use of bookmarks in the SMLOI.

The system user can introduce "breaks" and "bookmarks" in the information element vectors to have reference points within the sequence of information element entry. FIG. 26 shows such an implementation of bookmarks 220, 224 where, in that case, the bookmarks are relative to a period of time. For instance, two information elements 150 have been entered during the period P 222 which is delineated by bookmarks 220 and 224. The bookmarks may also be specifically placed by the user as period markers as shown in FIG. 26 and/or automatically by the SMLOI at every period of time and/or in any user-defined manner.

Figure 27:
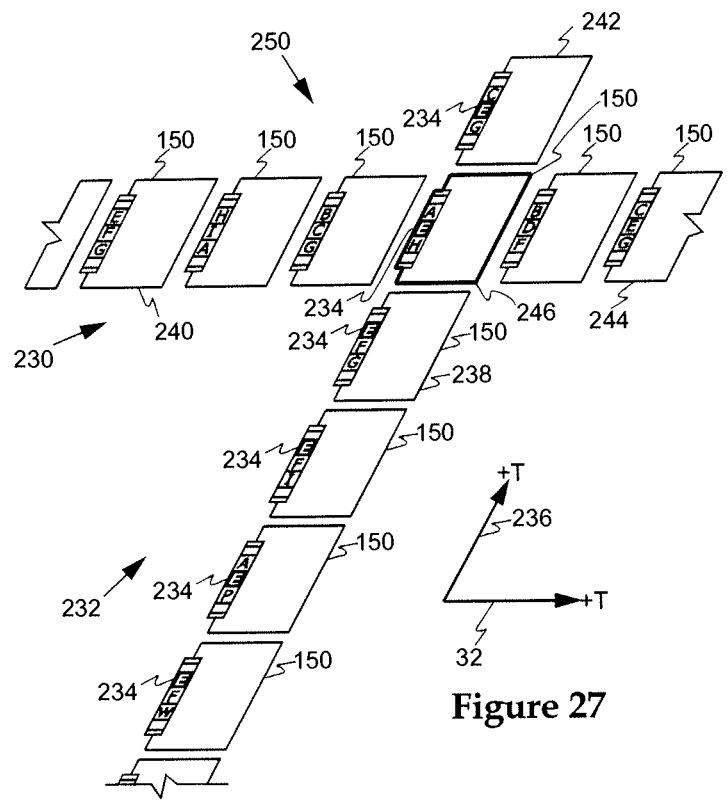
FIG. 27 depicts a bi-dimensional view of two intersecting information element vectors in the SMLOI.

FIG. 27 shows a bi-dimensional information element vector disposition where all the information elements 150 from the user's SMLOI are represented along a first (horizontal) vector 230, where the most recent is shown on the right side according to the time vector 32. Information element vector 230 is the first, or absolute, information element vector in the sense that all information elements 150 are present on the vector 230 (although a subset of all information elements can form vector 230). The first vector is illustratively horizontally disposed but a person skilled in the art would appreciate a different position is encompassed by the present patent application.

A second information element vector 232, that can be a subset of the first information element vector 230, is graphically represented, non parallel to, or intersecting the first information element vector 230. The second information element vector 232 is created when a desired characterization attribute, illustratively the "E" characterization attribute 234, is selected by the SMLOI user on at least one information element 246 from the first information element vector 230. The selection of the "E" characterization attribute 234 might automatically create the second information element vector 232. Illustratively, the selection of the desired "E" characterization attribute can be achieved by pressing a button "E" 234 on the desired information element 246. The information element 246 can also be automatically selected when the characterization attribute "E" 234 is selected without any other action. Conversely, if one characterization attribute, for instance the information attribute "E" 234, is primarily associated with desired information element 246 then selecting the desired information element 246 itself would automatically use the information attribute "E" 234 to generate the second information element vector 232 based on information attribute "E" 234. A single information attribute can be blindly associated to its related information element. The first information element can become invisible when the second information element vector becomes visible on the display device.

Figure 51:
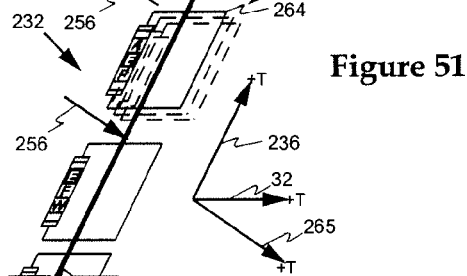
FIG. 51 depicts a bi-dimensional view of the SMLOI with non-parallel information element vectors intersecting in distinct planes.

The second information element vector 232 is generated by the SMLOI at a different angle (illustratively at a 90° angle from the absolute vector 230, on a 2D display) or on a different plane than the first information element vector 230 using the selected information element 246 as a reference (that is illustratively the intersection information element between the two vectors as appreciated on FIG. 51). On the second information element vector 232 are shown only the information elements, from the first information element vector, commonly sharing the "E" characterization attribute 234 (illustratively visually presented in the characterization attribute sub-area). The second information element vector 230 could also present a set of other information elements not present in the first information element vector 230 but related to the selected desired information element 246. The most recent information elements 150 is being shown at the upper end of the information element vector 232 according to the relative time vector 236. As a result, the information element vector 232 is built according to a pre-selected order e.g. in the present situation it is illustratively a chronological order.

There is no requirement to keep visible the information element vector 230 when the information element vector 232 is created and appears on the display. In this situation, the information element vector 232 will be positioned according to the position of the information element vector 230 before it disappeared from the display.

Information elements 238 and 240 are actually the unified format representation of the same repeated information element 240 because it appears in both the absolute (or first) information element vector 230 and the second information element vector 232 sorting the "E" characterization attribute 234. The duplicated information elements appear on the second information element vector 232 at their respective chronological positions. This is also true for elements 242 and 244. The generation of the second information element vector 232 can also be made according to the combinative logic equation of multiple characterization attributes (for instance: "A" AND ("B" OR "E")).

In the event only one characterization attribute is intended to be selectable from an information element the selection of the information element itself can automatically select the single selectable information attribute. The visual aspect of the information element could then not show the potential characterization attribute to simplify the amount of visual data associated to the information element. For instance, selecting a music album on a first vector would lead to generate a second vector displaying the songs contained in the album if the only characterization attribute of the album is "songs in the album". If the characterization attribute is associated to more than one type of information elements (i.e. songs and pictures for instance) the selection of the album would generate a second vector displaying the songs and the pictures associated with the album.

The absolute and relative information element vectors 230 and 232 in FIG. 27 illustratively create a plane (accordingly, they are co-planar but, as it will be explained later, they could also intersect on distinct planes). A volume can be generated depending on the number of information element vectors when depth is used for a third dimension as depicted by FIG. 29. This plan, or volume if the depth is used, can be considered as a vectorial space 250. The user of the present system can select the vertical or the horizontal axis as default axis. Any axis in any given direction could be selected, according to the preference of the user, to be the "main" axis. The default axis will be the axis presented when only one axis is visible when the user logs in the SMLOI.

Figure 28:
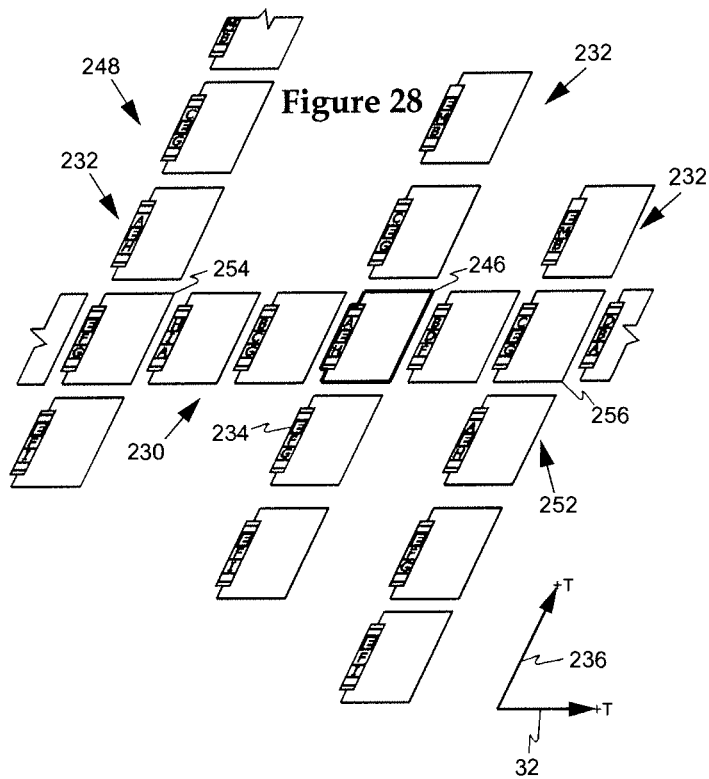
FIG. 28 depicts a bi-dimensional view of multiple intersecting information element vectors in the SMLOI.

More than one relative information element vectors be generated. Each relative information element vector 232 is intersecting an information element on the first information element vector 230 when the selected characterization attribute appears on elements found on the absolute information element vector 230. As shown in FIG. 28, two additional vertical vectors 248 and 252, aligned with elements 254 and 256, respectively, are provided. Other variations might be appreciated by a skilled person.

FIG. 29 shows the SMLOI, now "tri-dimensional" with the addition of assemblies 257, 258 and 259 (or information element versions) related to their respective information elements 262, 263 and 264. The first dimension is the absolute information element vector 230 according to the absolute time vector 32. The second dimension is the relative information element vector 232 containing the attribute "E" 234 according to the relative time vector 236 with its intersection centered on the desired information element 246 from which the characterization attribute "E" is illustratively selected. The third dimension is another relative information element vector relative to time vector 265 and shows the assemblies relative to information elements that possess at least one assembly. The more recent information element in the latter assembly is shown on top according to the time vector 256.

FIG. 30 shows that the system may have four dimensions. The four dimensions are presented on the SMLOI where 230, 270 is the first dimension, or absolute information element vector, 232, 271 is the second dimension or relative information element vector and 257, 272 is the third dimension or relative information element assemblies vector. Item 273 represents the fourth (illustratively) "circular" characterization attribute dimension. The characterization attribute choice, in order to generate the second dimension 232, 271, is a dimension that can be schematically represented as a "circular vector" because of the multiple different possible characterization attribute selection leading to various different second dimension information element vectors. This possible plurality of second information element vector can be visualized as orthogonal 273 to the first information element vector axis 230, 270.

FIG. 31 shows that since there are at least as many relative information element vectors 271, 275, 276 as there are characterization attributes, all the relative sequences can be represented as many rays 278 coming out of a center hub 280 that is the selected information element 246 on the absolute information element vector 270. The fourth dimension 273 as it appears on FIG. 31 is an array 278 (or rays) of information element vectors and the selection of one characterization attribute (or composition of many) dictates which relative sequence of information elements will lead to the generation of the relative information element vector 232. The SMLOI user can group the information elements by combination or segregation of characterization attributes. Using combinative logic, this actually would turn the fourth dimension 273 into an almost infinite number of rays around the center hub 280.

Association of characterization attribute(s) with an information element, or selection of characterization attribute(s), in order to generate an information element vector can be made automatically by the SMLOI. Algorithms, statistics and other mathematical equations are might help to choose the most applicable characterization attributes for a specified information elements or group of information elements in order to create an information element vector.

The SMLOI also provides an intuitive and efficient system for managing the user's elements of information, personal or professional in nature. The user and his or her professional information can be part of a bigger picture if he or she is an employee of a corporation for example. The SMLOI user is able to visualize his/her personal and professional/corporate SMLOI (distinction coming from one major attribute) at once or separately, and that that option be carried out through a single command.

A corporation is considered a moral user of the work related information of its employees. A corporation or other multi-user environment can have all its employees dealing with information elements in a similar manner for training purposes, and for the preservation of the "corporate knowledge" (structured and unstructured data), and for prior art recording purposes. The "corporate knowledge" is considered as a series of "parallel SMLOIs" with an SMLOI for each of its employees in a similar fashion to the previously described parallel paths for individuals. That way, some members of the corporation are able to access the information in the corporation's employees SMLOI.

Multiple and distinct SMLOI can seamlessly be presented on a same time line or axis. Personal and professional SMLOI can be presented on the same time line just as if both personal and professional SMLOIs are only one single SMLOI even if they are not. They just appear to be the same for the user. All the SMLOI of a corporation are similarly mixed and presented as a unique SMLOI, even if in reality they are not, representing the whole corporation's SMLOI.

At least one member of the corporation has the "knowledge administrator" status such an individual has full access to the corporate SMLOIs, can forward corporate messages to employees' SMLOI, and create standardized corporate characterization attributes to ensure cohesion in the filing, among other functions and capabilities. Such an administrator may have a formal role in a quality-assured environment, such as one governed by the ISO 9000 standard or a sophisticated information management analysis in order to provide an information management score that can quantitatively show the user's ability to manage its information.

The corporate administrator can represent the corporation in an intuitive manner, such as the corporation organizational chart 282 as presented in FIG. 32 and directly link to every corporate SMLOI in the corporation as shown on FIG. 33. FIG. 33 shows the corporate SMLOI of an employee that has the position 283 in the organizational chart 282. The planar representation on the organizational chart is considered as the fifth dimension of the SMLOI. The organizational chart for that purpose can be replaced by a grid 285 on FIG. 34 and is, to the corporation user or administrator, a graphical representation of the multiple users. In this case, a two-vector system, for instance "5x" 287 and "5y" 288 is used to "name" different SMLOI users in the corporation, using an alpha numeric format. Other formats may also be implemented.

FIG. 34 shows the fifth-dimension grid 285 where squares are filled using different patterns according to possible access. The grid of FIG. 34 is seen through the eyes of a user represented by box 294 of FIG. 36. As indicated by square 292 of FIG. 34, total access is given at that position of the grid. Hatched squares as in box 296 indicate the SMLOI of fellow employees to which the user 294 (FIG. 36) has full access (professional/corporate side only). Cross-hatched squares in box 297 indicate an SMLOI where punctual or microscopic access has been granted to user 294 (of box 292) allowing visualization of selected elements only. Smaller cross-hatched squares as in box 298 indicate the SMLOI to which the user of box 292 has absolutely no access to.

FIG. 35 shows the multidimensional graphic user interface of an employee of the corporation SMLOI where dimension one 270, dimension two 271, dimension three 272, and dimension four 273, as presciently described, can be seen. Dimension five 287, 288 may also be added. The darkened square contour of the grid 283 at the position "B2" indicates that the SMLOI 290 is the SMLOI of the "B2" employee.

An employee may allow access to his or her SMLOI, in part or in whole, to another employee or user. The user has only access to a portion of its SMLOI (such as the professional part) while maintaining the privacy of the remaining portion (such as the personal part).

Figure 37:
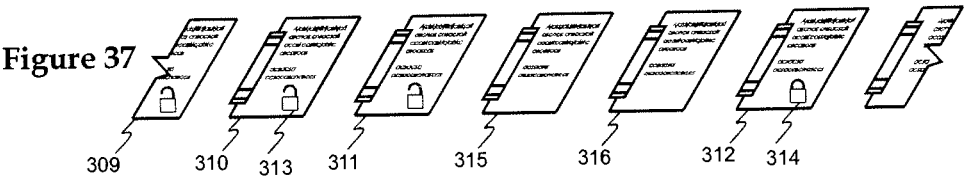
FIG. 37 depicts a uni-dimensional view of the SMLOI with access codes.

FIG. 37 presents the absolute information element vector of the SMLOI of a user "A" where it is possible to see that information elements 315 and 316 have no access restriction. Information elements 309, 310 and 311 can be locked so the user can block modification access to them. The open padlock icon 313 is representing that access is open although it can be locked. The lock 314 on information element 312 indicates the access is denied (which is a default mode for personal information elements).

Figure 38:
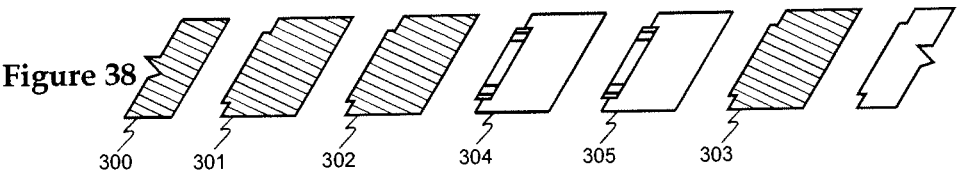
FIG. 38 depicts a uni-dimensional limited access view of the SMLOI.

FIG. 38 shows the absolute information element vector of the SMLOI of a user "A", as seen through the eyes of a user "B", where "B" has only access to some information elements. Items that have a dark hatch filling 300, 301, 302, 303 are information elements for which access has been denied to "B" (because of the professional/personal firewall and/or specific access restrictions for a given element). Items 304, 305, with no hatch filling, are seen as they would be through the eyes of a user "A", the SMLOI owner. These information elements can be seen by the user "B" through his/her SMLOI.

Figure 39:
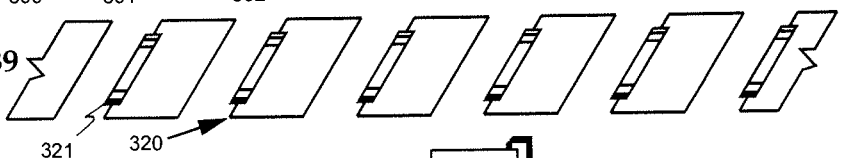
FIG. 39 depicts a privacy-enhanced view of the SMLOI.

For privacy reasons it is desirable that non-accessible elements, or their quantity be non-visible to other users. FIG. 39 shows the same SMLOI, as seen through the eyes of user "B", where all non-accessible elements are hidden, and space between accessible elements is reduced. For similar reasons, some parts of the seeable information elements, such as entry sequence numbers, may be hidden as well. Accessible information elements vector 320 all have their entry number "blacked out" so that neither the number of elements in the SMLOI or their relative position in the sequence can be known of user "B".

Figure 40:
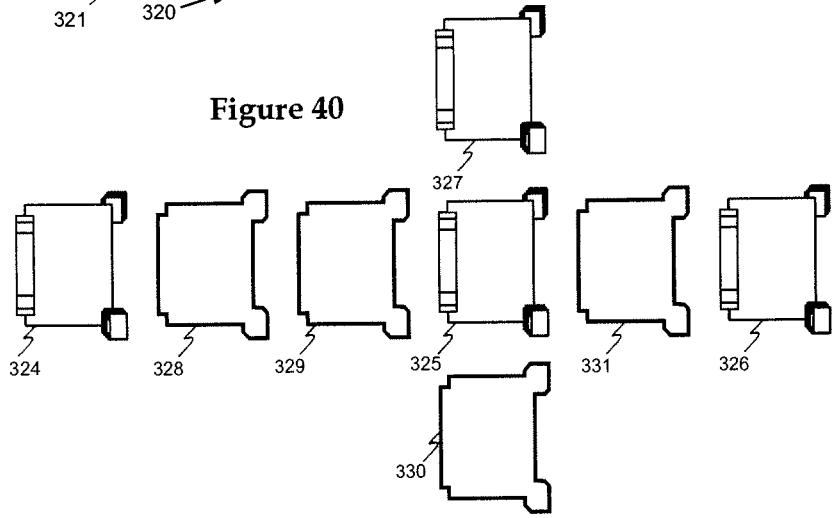
FIG. 40 depicts a bi-dimensional limited access view of the SMLOI.

FIG. 40 shows information element vectors of the SMLOI of one user "A" where, the user has granted access to information elements 324, 325, 326, 327 to user "B" while refusing him/her access to elements 328, 329, 330, 331.

Figure 41:
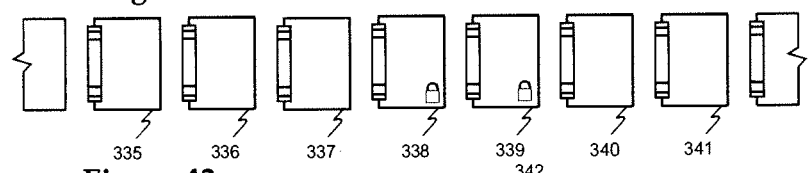
FIG. 41 depicts a uni-dimensional view of the SMLOI.
Figure 42:
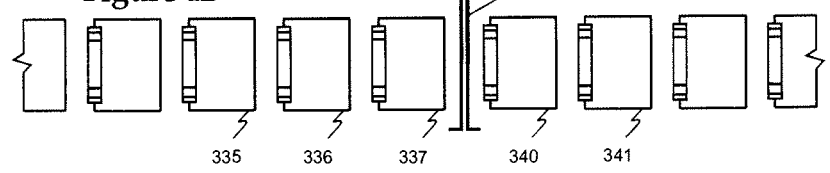
FIG. 42 depicts a uni-dimensional view of the SMLOI in privacy-enhanced mode.

FIG. 41 shows an absolute information element vector, from the SMLOI of a user "A", from which information elements 338 and 339 are locked so they cannot appear in the "B" user's SMLOI. FIG. 42 shows the same SMLOI, as viewed through the "eyes" (and SMLOI) of user "B". Information elements are hidden and replaced by one empty space 342 having a size that is irrelevant of the number of hidden information elements.

The Illustrated Interface

Figure 43:
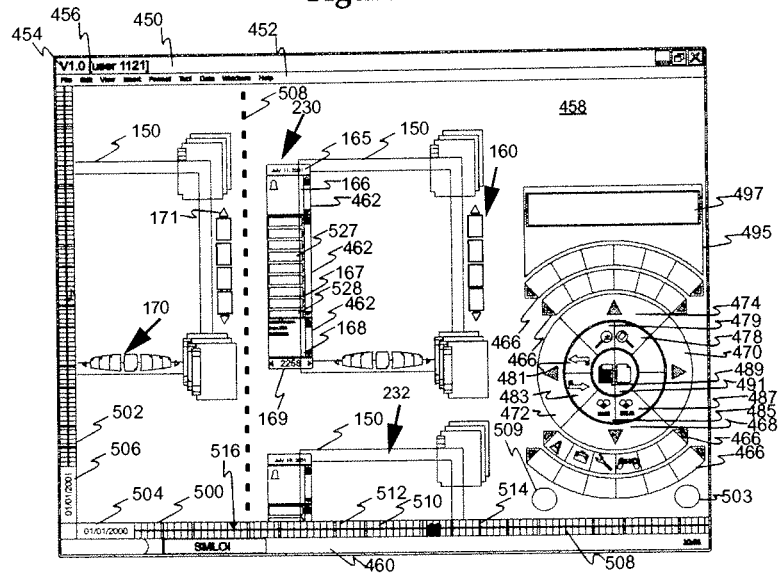
FIG. 43 depicts a proposed graphical interface for the SMLOI.

One proposed SMLOI interface using a typical windows-like environment main screen is shown in FIG. 43 although, the SMLOI can also be voice controlled. Item 450 is the operating system's bar displaying SMLOI details such as version 454 and user ID 456 (user name and user number). Item 452 is the menu bar of typical format and usage. Display of this item is left to the user's discretion. Item 458 is the window through which the SMLOI relays most of the information to the user. This is the window where the SMLOI is displayed, is known as the SMLOI window, and occupies the better part of the screen. This window completely fills the space between the menu bar 452 (if displayed) and the status bar 460.

A typical information element 150 is shown in FIG. 43 with its date of entry sub-area 165, an event-task-action sub-area 166, an information element characterization attributes sub-area 167, a hyperlink sub-area 168 and an entry sequence number sub-area 169. The anterior and ulterior assemblies area 170 are also shown as is the multi-pages document area 160. Scroll down buttons 462 are presented on some sub-areas. Margins from the original document 464 are also presented in FIG. 43.

The multi-part toolbox 466 is presented and acts on different functions available depending on the actions the SMLOI user is doing. The toolbox 466 includes buttons identified by icons that allow the SMLOI user to act on selected elements. In some cases the buttons may call menus or dialog boxes.

The navigation box 468 of FIG. 43 includes buttons to navigate in the SMLOI. It contains all the buttons, identified by icons, to allow the user to surf or navigate in his/her SMLOI. Button 470 allows movement along the absolute information element vector 230 according to positive time vector 32. Button 472 allows movement along the absolute information element vector 230 in the time vector 32 opposite direction. Button 474 allows movement along the relative information element vector 232 according to positive time vector 236. Button 476 allows movement along the relative information element vector 232 in the time vector 236 opposite direction. Button 478 is for the "zoom window" function, while button 479 is for "zoom-in" and "zoom out" functions. Button 481 is the "back to the last view" function and button 483 is for "forward to the next visualized view" function. These functions are similar to the "back" and "forward" functions on a web browser. Button 485 allows the SMLOI user to access his/her intra-SMLOI favorites' list while button 487 allows access to his/her Internet favorites' list.

Button 489 allows the user to return directly to the last information element entered in the SMLOI while button 491 opens a new "blank" information element in the SMLOI. This enables the user to work directly on the new information element for inserting pictures or for adding text on a particular project. This is one way the SMLOI can act as a logbook or notebook.

The communication box 495 includes a communication information window 497 for displaying all the information the SMLOI wants the user to know when he or she is using it. The communication information window 497 concentrates all the communications in the same place; as such, it can display alarms, chat, enter phone calls, instant messaging, provide an image of another person when video conferencing or video phone calls. E-mail features are also presented in the communication information window 497 and usual functions such as in-box, new messages, attach document to message, reply, reply to all, transfer, exchange an element, sending box, sent box and contacts are available. The agenda and its related functions including adding the agenda or linking an information element to the agenda are also included. Both the e-mail and agenda capabilities are fully integrated in the SMLOI.

FIG. 43 also illustratively shows the absolute relativisation bar 500 and the relative relativisation bar 502. The purpose of these bars is to provide a broader, but still limited, point of view to the SMLOI user. The user sets limit dates 504 and 506 for each bar so that the length of the time frame represented is customized to the user's desires. Days 508, weeks 510, months 512 and years 514 are displayed time marks, illustratively as little bars (each with their own format), in the relativisation bars 500, 502. The "relative" relativisation bar 502 is only visible when a relative information element vector 232 ($2^{nd}$ dimension) is displayed. Signs of different shape and colors (for instance black triangle 516) can be added as bookmarks to keep trace of important information elements. A cursor (not shown) providing the actual viewing position of the SMLOI is provided so it is possible to drag it to move quickly in the SMLOI.

The user can use its SMLOI in five distinct modes: information elements consultation, information element insertion/ creation, information element modification, information elements list and extraction. The toolbox 466 includes different functions related to those different SMLOI modes. There is, for instance, different functions related to the insertion mode: favorites (bookmark, hyperlink, hyperpage), quick insertion (direct insertion without extrinsic attributes), tasks, notes, events, video sequences, audio sequences, digitalization (paper, other), and project creation (reports, slides presentations, collections).

The toolbox 466 also includes functions related to the manipulation mode. The buttons include square manipulation tool, copy, paste, element selection, annotation manipulation, hide element (by sequence of entry number, by date), and search (by sequence of entry number, by characterization attributes, combinative logic, by date, by contact, by key word, by document type, options). There are also functions related to the extraction mode with buttons for deleting, information element collection (add element, remove element, save collection as a new information element, add note in collection, print collection, present collection as slides). The toolbox 466 also includes a system functions section including buttons for setup (personal setup, system setup, general setup, corporate administrator), "favorites" setup, authentication and signature (document authentication, electronic signature), back-up, help, screen management (screen saver, wallpaper, information element presentation sequence) and the like.

Window 458 of the SMLOI includes two buttons 503 and 509. If the user clicks on the appropriate button, only the personal portion of his/her SMLOI can be visualized 503. If he/she clicks on the second button, only the professional/corporate portion of his/her SMLOI can then be visualized 509. Clicking on both buttons 503, 509 (might be done with or without the use of the CTRL and SHIFT keys) will allow visualization of both portions of his/her SMLOI.

FIG. 43 shows a typical information element 150, with an information element characterization attributes sub-area 167, into which each characterization attribute is actually a button 527, or selecting means, that can be clicked for picking the information elements to be included in the information elements of the relative vector. Selecting blank button 528 at the bottom pulls out the main attributes' list for selection of the second dimension. Simple addition of characterization attributes to the selection can also be achieved in a typical fashion by using the CTRL and SHIFT keys from the keyboard. The user is also offered the possibility of including any given attribute in a combinative logic equation for the selection of the second dimension's vector 232 (a pull-down menu can appear for additions and exclusions). Such combinative logic capability can, for instance, allows the user to set border dates for his/her selection of elements carrying the attribute "x", allows him/her to set border entry numbers dates for his/her selection of elements carrying the attribute "y", allows him/her to look for attributes common to other system (such as events) or even allow element selection based on common status (such as tasks).

Figure 44:
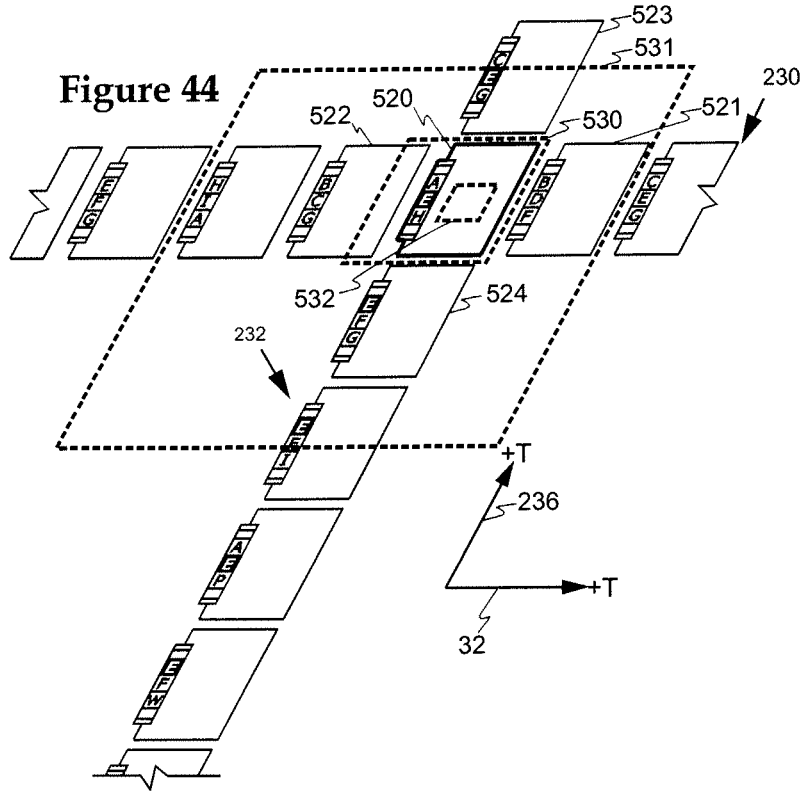
FIG. 44 depicts multiple view size windows of the SMLOI.

FIG. 44 shows a view of a user's SMLOI where the central information element is 520. Elements 522 and 521 are the preceding and following information elements along the absolute information element vector 230, respectively. Information elements 524 and 523 are the preceding and following information elements along the relative information element vector 232, respectively. Window 530 presents a close view of information element 520. Window 531 presents a zoom-out view of information element 520 and shows, at the same time, the preceding and the following information elements in order to provide a better perspective of the visualized information element 520. Window 532 is a zoom-in view of a part of information element 520 that provides the possibility for the user to visualize details of the information element 520. The zoom-in and zoom-out function can show a significant number of information elements to get the big picture of the information element distribution along the information element vectors 230, 232 or, conversely, could show only a small portion of one information element to see or work on small details.

Figure 45:
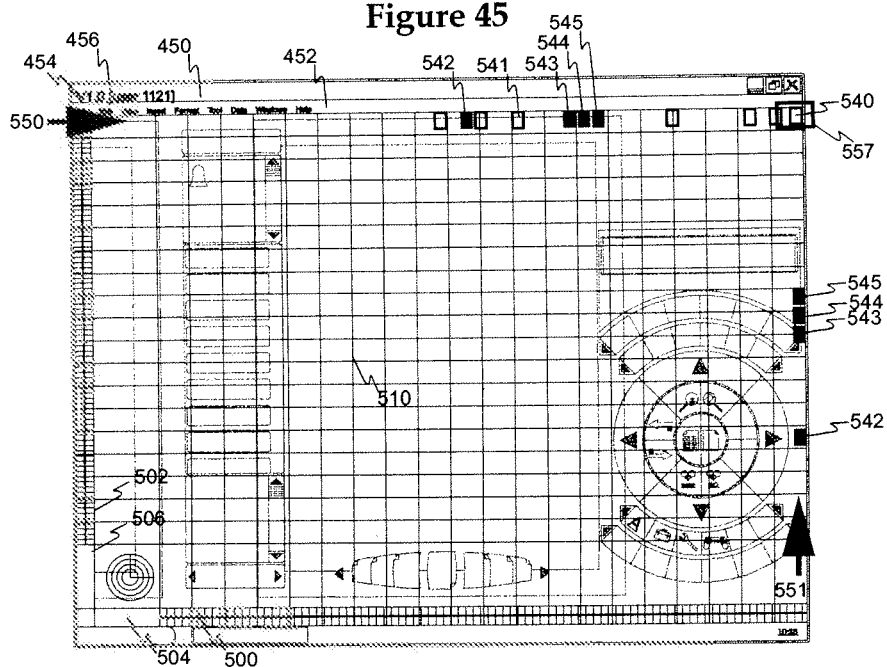
FIG. 45 depicts a proposed "radar-screen" in the SMLOI.

The SMLOI also has a "radar screen" display format as illustratively shown by FIG. 45. The absolute relativisation bar 500 and the relative relativisation bar 502, as previously mentioned, have weekly time marks 510 (for instance, can be by days, months or other specific time length) extended upward and to the right respectively to effectively create a time grid. An absolute information element vector 550 appears on the grid, and, accordingly, each of its information elements appears as squares 541, 542, 543, 544. The color (and shape) of squares 541, 542, 543, 544 information elements and other visual particularities, illustratively the information element may flash, be animated or have a portion showing a different color or a sign that indicates something more specific about the information element(s). For instance, it can show search results or information elements representing tasks for which the deadline is approaching, show an action is past due, the status of the information element has changed since the last time the user has logged in or simply to attract the SMLOI user's attention for a predetermined reason. This can be linked to any particular area 156 related aspect or any characterization attribute related to an information element. It has to be noted the spacing between information elements might be constant (when the time scale varies) or varies in accordance with the time that has passed between each information elements (when the time scale is fixed). The later is illustratively used for representing both the absolute and the relative information element vectors 550, 551. The fixed or unequal time scale can also be used when not in the radar mode throughout the SMLOI. The relative information element vector 551 presents the same four information elements 542, 543, 544, 545 that appear in the absolute information element vector 550 that share the same selection of characterization attributes. A diagonal representation (not shown) according to the two relativisation bars, referred as 500 and 502 on FIG. 43 but not numbered on FIG. 45, time frame can be utilized as well. It also has to be noted this high level view of information elements 541, 542, 543, 544 can be used outside the "radar screen" as information elements representations in the SMLOI showing only a limited amount of information to help the user focuses on a limited transfer of knowledge from a series of information elements. Selecting, illustratively to double click an information element in its reduced visual appearance, can bring a more detailed view of the same information element, show more details or trigger an action or, illustratively, open a related file in another program.

The "radar screen" display format as shown in FIG. 45 allows the user to have a meaningful overview of what is happening in its SMLOI. Colors and movements add information to the visual distribution of the schematized information elements. The background is used to visualized and magnify a selected portion of the SMLOI found in the "radar screen" and is represented by the box 557. As an alternate way of navigating in the SMLOI, the user can drag, move or resize the selection box 557 and the background view will change accordingly so that the user can visualize whatever information element is in the "radar screen" selection box 557. This function acts like a magnifying glass on a map. When the user is switching from the visualization of an information element to the radar mode, box 557 on the radar mode will show exactly how the presented information element was on the display device. Also, change in the selection box 557 will change the background view as well.

Figure 46:
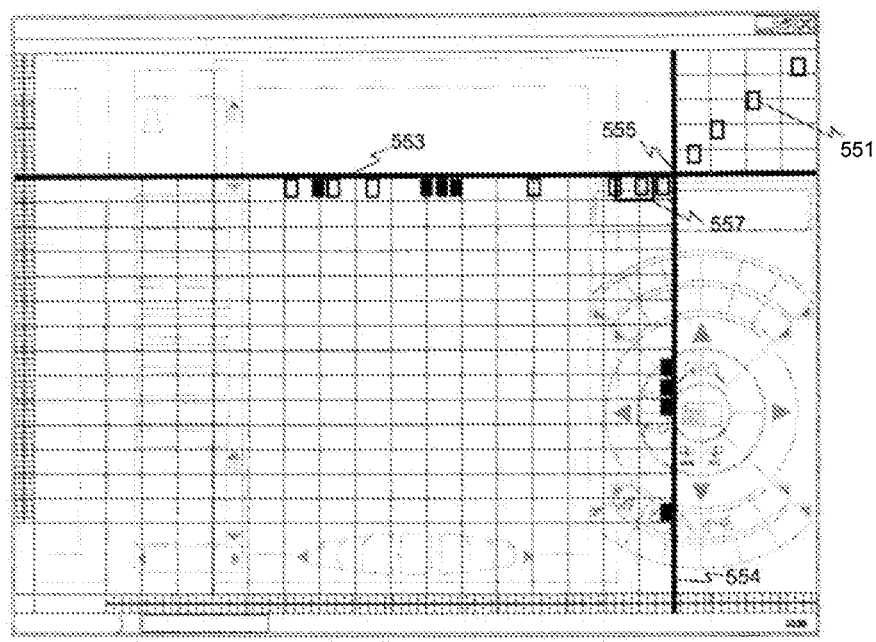
FIG. 46 depicts a proposed "radar-screen" presenting the future in the SMLOI.

FIG. 46 shows the SMLOI in an alternate "radar screen" display format, including the "future" area 550 that acts like an agenda. Accordingly, information element 551 is a task to be done according to the time frame of the relativisation bars 500 and 502. Separators 553 and 554 visually separate the past and the future and, in fact, 553 and 554 are the lines of the present and their intersection point is "now". This is a way for the user to graphically represent his/her "to do" list.

Figure 47:
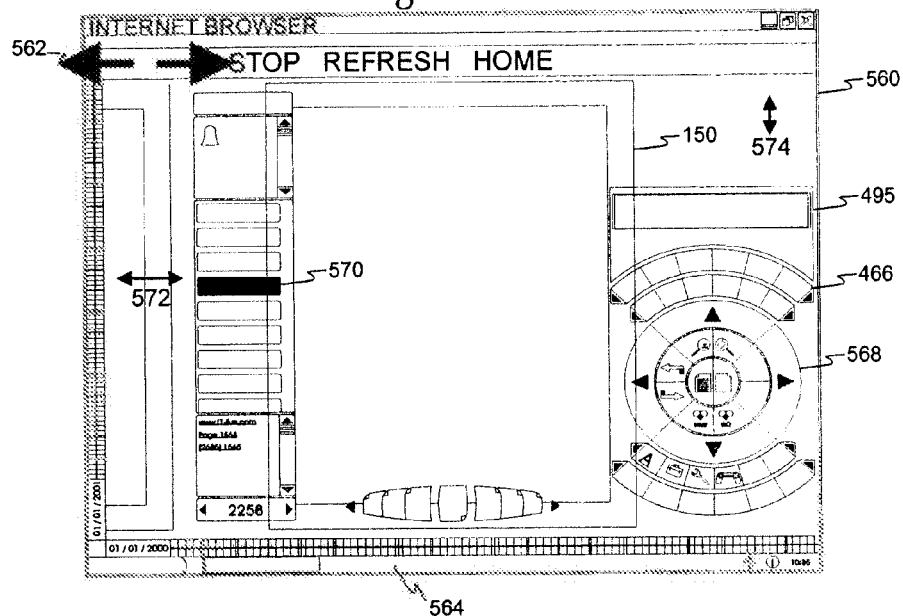
FIG. 47 depicts a proposed view of the SMLOI in a web browser window.

In FIG. 47 is shown the SMLOI using a web browser or a plug-in applied to a standard web browser. This way, everyone using a web browser (i.e. for example Netscape™ Navigator™ or Microsoft™ Internet Explorer™) can add a plug-in (or means to adapt the web browser to use, to visualize or to act on the SMLOI) that allows the multi-dimensional data locating system to run on the web browser. A user can access data, information elements, documents or standard web pages using a web browser with the SMLOI. Non-users can visualize information, adapted web pages or other documents using a web browser with a plug-in. Users can allow access to specific information element to be viewed by other authorized users and non-authorized users with an appropriate web browser. Is considered here a web browser any device that allows navigation on the Internet. While using a web browser it is understood that the SMLOI can be web based and communication with the user is made using a network.

FIG. 47 shows the SMLOI using a web browser as a base program. Item 560 represents the web browser software window. Item 562 represents the web browser classic tools, icons and toolbars. Item 564 represents the windows-like OS task bar, item 466 represents the multi-dimensional data locating system SMLOI toolbox, item 568 represents the multi-dimensional data locating system navigation toolbox, item 150 represents the information element presented in the multi-dimensional data locating system inside the web browser, item 570 represents a selected attribute generating the second dimension in the multi-dimensional data locating system, item 572 represents the absolute information element vector and item 574 represents the relative information element vector.

Story, Game and Simulation with the SMLOI

In order to add meaning to the information contained inside the SMLOI a story or a "game metaphor" can be applied to the vectorial space. This would help to link information elements between them to improve the user understanding. If necessary, when using a "game metaphor", a score could be calculated using multiple parameters. The SMLOI can use a 3D/virtual reality environment and, to some extent, turn the "chore" of SMLOI into some sort of a game; the system could keep records and statistics of a user's performance as an information organizer and user.

Parameters can be as simple as the time to retrieve any information element, the number of elements inserted in the SMLOI per period of time, the number of information elements exchanged per period of time, the average number of characterization attributes applied to the information elements inserted in the SMLOI or the number of information elements visualized in the SMLOI per period of time. Those examples are given to explain that certain parameters can be evaluated and that a score can be attributed according to pre-established standards. Statistic curves can be used to represent what is considered by an individual or by a company as "information management standards".

Figure 48:
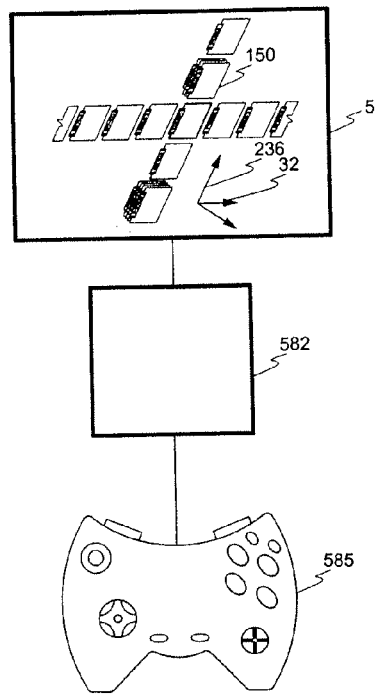
FIG. 48 depicts SMLOI as part of a typical game console.
Figure 49:
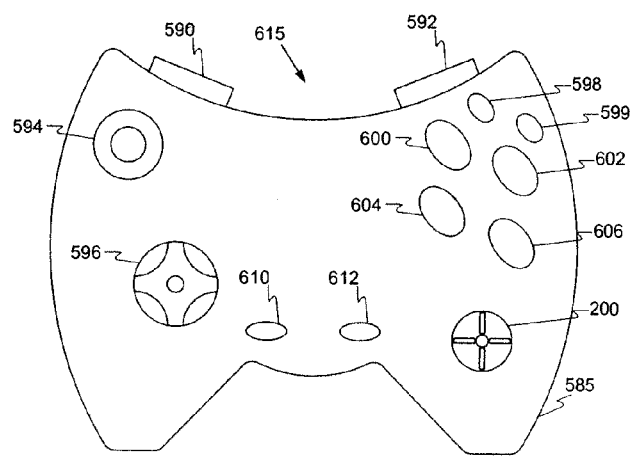
FIG. 49 depicts a typical game console controller.

The possibility is given to the user to access his/her SMLOI and some SMLOI functions and tools through other computerized devices, such as a game console, an MP3 player or a PDA. In such cases, the program could be "installed" by the insertion of a "game cartridge", i.e. a self-contained software/memory block package, or by Internet download. FIG. 48 shows the SMLOI as seen through a game console 582 and computer-controlled display 580 such as a TV screen. The actions are illustratively done using the game controller 585. FIG. 49 shows a typical game console controller. Just as with any game, the user/player can attribute specific commands to most buttons and knobs. Normally the game controller includes a left trigger 590, a right trigger 592, a left thumbstick 594, a left directional pad 596, a white button 598, a black button 599, a "Y" button 600, a "B" button 602, a "X" button 604, a "A" button 606, a right thumbstick 608, a "back" button 610 and a "start" button 612. Multiple extension slots 615 can be used for connecting additional memory or for connecting a microphone/headset device. Other game controllers like the Wii™, where the user has not physical connection with the computer or the game console is encompassed by the present invention. Movements of the game controller influence the actions on the SMLOI.

For example, illustratively with a more classic game controller, the SMLOI commands could be allocated as follows: the left trigger 590 to move between information elements going back in time, the right trigger 592 to move between information elements going forward in time, a left thumbstick 594 to move on the absolute information element vector 230 and the relative information element vector 232 and to move the box 557 when in the previously described "radar screen" display format. A click on the left thumbstick 594 selects the visualized information element 150, the left directional pad 596 has basically the same functions as the left thumbstick 594, the white button 598 inserts a new blank information element 150 ready to be written while the black button 599 brings the user directly to the last information element inserted into the SMLOI. The "Y" button 600 accesses the "radar screen" display format, the "B" button 602 accesses sequentially the different modes in the SMLOI when an information element is selected, the "X" button 604 selects the communication box 495 and the "A" button 606 selects the toolbox 466. The right thumbstick 608 is used to move a "pan" view if no information element is selected and moves into the different areas/sub-areas if an information element is selected; a click on the right thumbstick 608 would select the pointed area part, the "back" button 610 would be utilized just as the back button on a classic web browser and the "start" button 612 would keep the same role as on a game console.

Multiple command interactions can also be described. For instance, a click and hold on the left thumbstick in addition to the right/left trigger would provide a zoom-in/zoom-out effect. Also, the white button 598 or the black button 599 could be used in conjunction with the right or left triggers 590, 592 to provide other specific commands; this could be fully customizable by the user. One of the goals of adding a "game metaphor" is to improve the user experience and to bring him/her to a point where managing information is not a burden anymore but a funny intuitive interesting task. One other goal is to have a score that quantify the efficiency of the user information management.

Other Uses of the SMLOI

Figure 50:
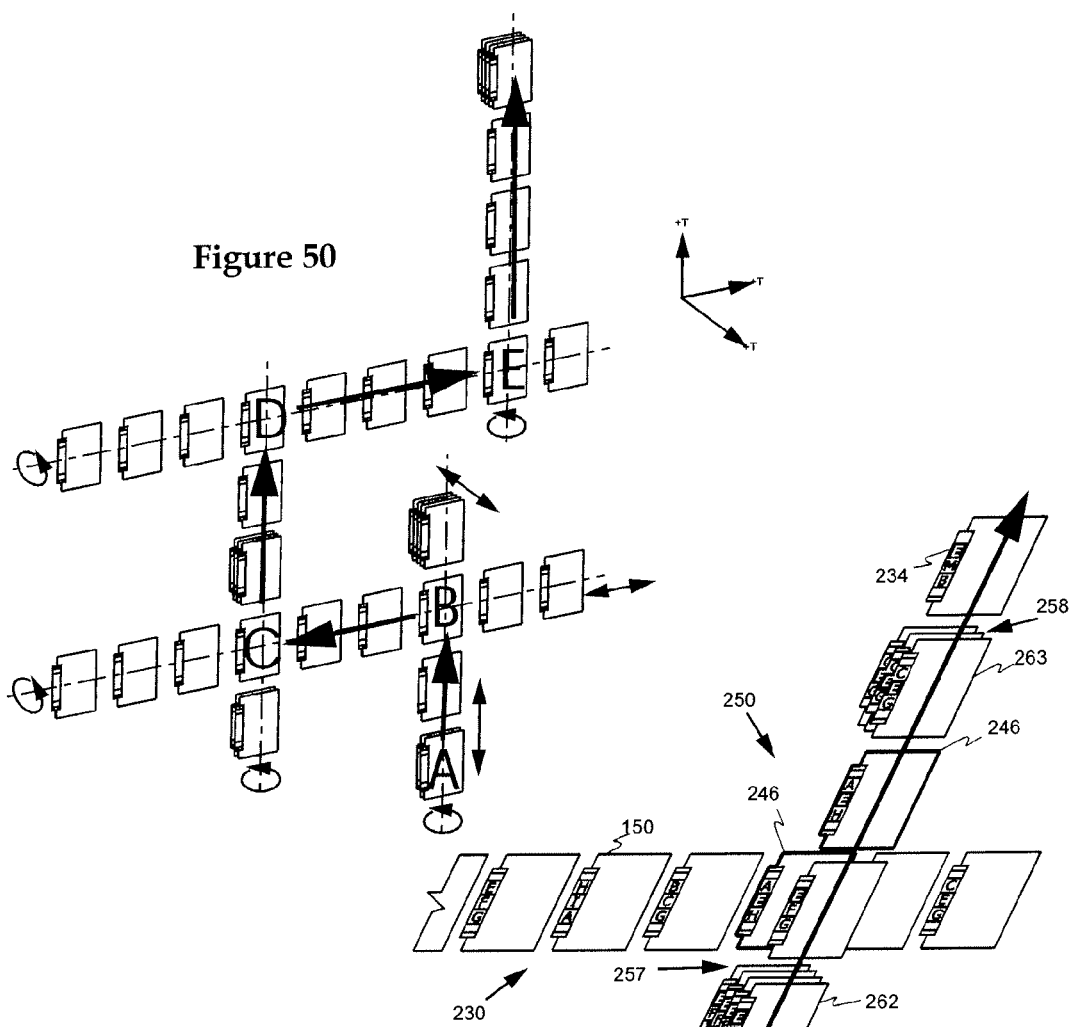
FIG. 50 depicts a path using multiple information element vectors.

Referring now to FIG. 50, it can be appreciated the SMLOI can become a true relational search tool. Navigation in the SMLOI, beginning with an information element, can move on a first information element vector until the user wants to know more about a first information element encountered on the first information element vector. A characterization attribute is then selected on the first information element to generate a second information element vector showing information elements possessing the selected characterization attribute. The user continues the navigation on the second information element vector until the user wants to know more about a second information element encountered on the second information element vector. A characterization attribute is then selected from the second information element to generate a third information element vector and so forth. This provides an intuitive spatial and graphical relational navigation that could truly be represented on a display device.

FIG. 51 shows a first information element vector 230 and a second information element vector 232 where the "base" intersecting element 246, possessing characterization attributes A, E and H, is duplicated. This superposition of the second information element vector 232 allows the user to vertically move (or navigate, or scroll) the second information element vector 232 while always keeping the first information element vector 230 in the line of sight at the same place on the display device. This helps the user to go explore the second information element vector 232 without loosing its "base" on the first information element vector 230. The second information element vector 232 is illustratively superposing the first information element vector 230 in a distinct plane on FIG. 51 but could perfectly be in the same plane and just curve above the first information element vector 230 when it comes close to the first information element vector. One skilled in the art would easily see other variations to achieve similar results.

The vectors in the SMLOI can be disposed on the side of the screen instead of in the middle of the screen. If the user wants to see what is higher on the vertical axis he scrolls the vertical vector down, thus moving the horizontal axis accordingly. The enlarged information element remaining on the screen slightly moves higher to leave space (down) for positioning the horizontal vector following the movement of the vertical scrolling of the vertical vector. If the scrolling continues, the information element gets bigger taking back the area left unoccupied by the horizontal vector not anymore visible on the screen (because moved lower than the lowermost portion of the screen). These movements can be seen as animation of the vector and the enlarged information element on the screen according to the movement of the vector dictated by the SMLOI's user.

Figure 52:
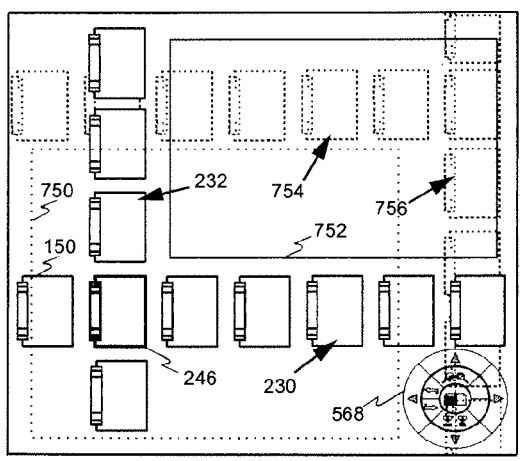
FIG. 52 depicts a bi-dimensional view of the SMLOI with animated movements of the information element vectors reacting to navigation in the SMLOI.

Referring now to FIG. 52, the positions of the first absolute information element vector 230 and the second, or relative, vector 232 are disposed on the bottom-left side of the screen to maximize the useful area 752 on the screen to, illustratively, present an information element in bigger format allowing to see finer details. The position of information element vectors 230, 232 can move, or be animated, to maximize area on the screen to see a bigger picture of an element or any other information useful to the SMLOI's user. This function is depicted by FIG. 52 where the information element vectors 230, 232 changed position to, respectively, reach positions 754, 756 and leaves useful area 750 for illustratively visualizing an information element in greater details. These movements on the vectors can be based on the navigational actions of the user in the SMLOI. For instance, when the user moves along an vector searching for a particular information element, it is possible he/she moves the vector thus effecting the position of the vector on the screen in order to maximize the useful area 752. If the relative information element vector 232 moves from the left side of the screen to the right side of the screen, the position of the useful area 752 moves from the right side of the screen to the left side of the screen to adjust with the position of the vector. Room can remain for the navigation tools between the side of the screen (or any means for visualizing the axis) and vectors. Other animations, like when an information element is selected to be viewed in the useful area 752 it progressively moves from the vector to the useful area 752, can also be made.

Streamed media content can be automatically added to the SMLOI of a user wanting such information to be added to his SMLOI. Newspapers, magazine, financial data, web pages, weather forecasts, and other information can be streamed in the SMLOI of a user. Copyright fees can be automatically calculated and billed to the SMLOI user on a timely basis. Each information element in the SMLOI that is not created by the user of the SMLOI can be subject to copyright or other intellectual property license. The amount due to owners of the intellectual property rights can be automatically calculated by the SMLOI and collected from the SMLOI's user.

Blogs are well known in the art. They are generally disposed as a number of sequential communications posted one on top of the other. This forms a vertical "stream" of distinct communications having at least one common topic. The blog contains a number of information elements on the form of a plurality of short texts related to a particular topic. In the context of this patent application, the blog can be considered a vector. It would become possible to generate another vector just as previously described in this specification by selecting a particular message in the blog. More precise navigation can be obtained by selecting more precise blog attributes to generate more refined vectors.

Patent prior art management is a possible real life application of this SMLOI. Standard patent information such as the title, the inventor's name, the classification, the filing date, the priority date (if any) . . . . Are considered intrinsic attributes and can be gathered automatically using an internet crawler. Once the image of each page of the patent is collected by the SMLOI, the full text in searchable format and the standard patent information are collected, extrinsic information element attributes can be applied. Illustratively, all collected patents appear on the absolute information element vector. The extrinsic information attributes could be represented, illustratively, in the automotive field, as the mechanical systems (i.e. drive, electrical, transmission, fuel, suspension, brake, hydraulic, seating . . . ). These mechanical systems can be subdivided in more refined sub-systems (i.e. suspension system could be subdivided as: shock absorber, coil, rubber mounts, fasteners, MacPherson type suspension, double a-arm suspension, bumpsteer . . . ). These extrinsic attributes can be applied when patents are analyzed. This classification would rapidly provide a precise and narrow search about a specific patent using the SMLOI.

Each attribute can correspond to another completely different attribute using a cross-reference table. A correspondence is made in the table when two different attributes are related but are on different topics and are unlikely to be selected together because they relate to different users but could be useful for each of them. When one attribute is selected the other will be automatically selected. Other actions may be applied on the second attribute as a consequence of the first attribute. One skilled in the art could make many other examples of similar or related applications without departing from the scope of the SMLOI.

Writing directly in an empty information element (i.e. blank page) can be used as an e-mail to be sent because the e-mail messaging system is fully embedded in the SMLOI. Each information element has its own little "word processing" providing each information element with writing or noting capabilities and therefore be a potential note or e-mail.

The server setup (SMTP, POP, POP3 . . . ) is embedded directly in the SMLOI. Selected information elements, individually or by cluster, can directly be sent by e-mail as an e-mail with or without attachments. Embedding in the SMLOI the e-mail system procures the SMLOI a seamless communication capability removing the need of having an e-mail system distinct from the SMLOI. In fact, the SMLOI could fully integrate all functions of an operating system and completely integrate all functions of the operating system (which is not really seen as useful from a user point of view if not to manage files and interconnect various third party applications). Instant messaging, video communication and the like are also intended to be part of the communication system embedded in the SMLOI.

When inserting a batch of information elements in the SMLOI from a classic folder and subfolder classification, the classic folder classification is transferred into attributes on each information element entered in the SMLOI. This provides the possibility for a user to retrieve an information element based on its former location despite the information element is not really located in the folder/subfolder classification.

The SMLOI can also be utilized with a MP3 music player to manage music, albums and songs. The round multidirectional interface of the well known iPod™ is quite similar to the navigation tool of the SMLOI disclosed in the illustrative embodiment. The iPod's interface manages navigation on the X (absolute) and Y (relative) vectors by simply pressing the click wheel at 0, 90, 180 and 270 degree, by turning the click wheel the user can zoom in/out. Conversely, pressing the click wheel at 0, 90, 180 and 270 degree can zoom in/out the SMLOI interface. Data synchronization is automatic with the SMLOI when the iPod is connected with its base computer or on any computer in the case the SMLOI is web-based. It is encompassed by the present patent application to fully integrate the SMLOI to the iPod's interface and possible functionalities. The SMLOI's attributes are integrated in the iPod menu. The attributes would be managed by the iPod's interface just like the music menu of the iPod. Similarly, the information element vectors might be moved by directly using fingers on a touch screen.

Uniform and Non-Uniform Timeline

Figure 53:
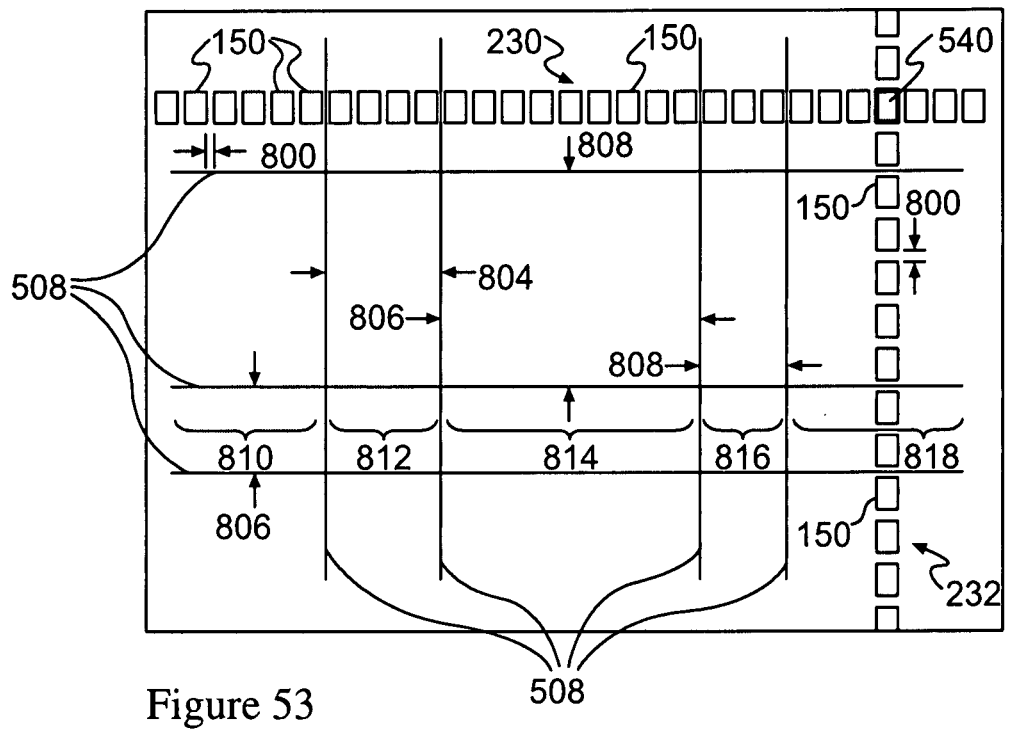
FIG. 53 depicts a bi-dimensional view of the SMLOI using a non-uniform timeline.
Figure 54:
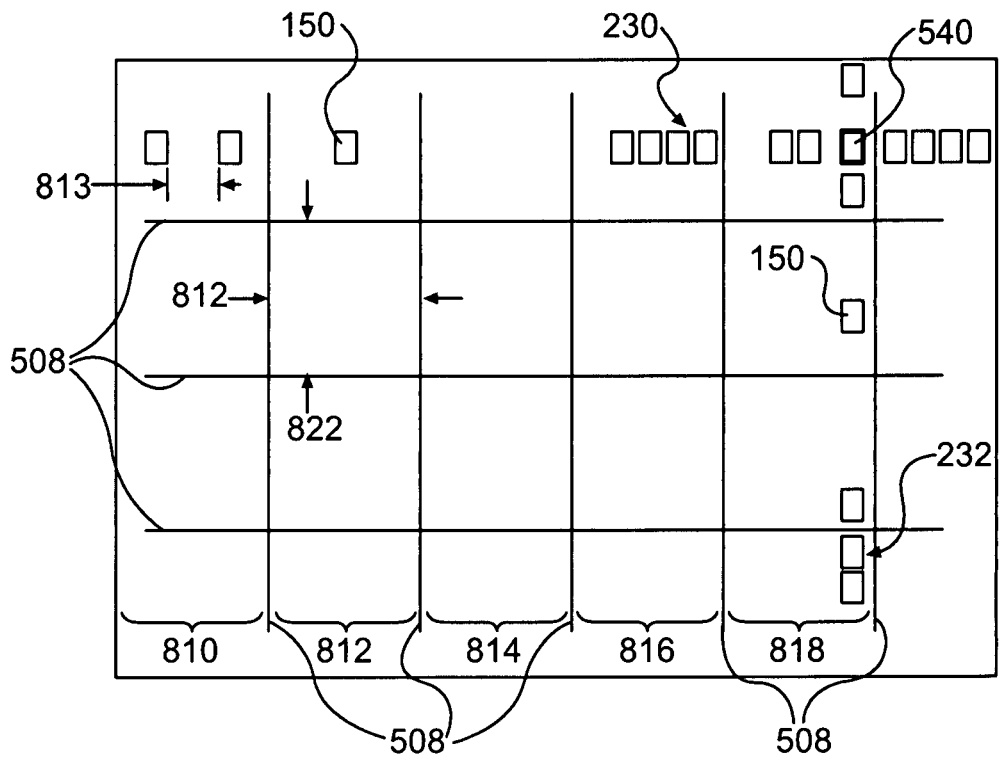
FIG. 54 depicts a bi-dimensional view of the SMLOI using a uniform timeline.

Referring now to FIGS. 53 and 54, it is desirable to selectively represent the information elements 150 on information element vectors 230, 232 according to a non-uniform timeline (FIG. 53) and a uniform timeline (FIG. 54). The uniform timeline is graphically representing time (time_scale) in a constant and linear fashion on the display. The non-uniform timeline is graphically representing time (timescale) in a non-constant and non-linear fashion where time (identified as timeline) can be contracted or expanded to accommodate the evenly distributed graphical representation of the information elements 150 on the information element vectors 230, 232. On FIGS. 53 and 54, the information element vectors 230, 232 are also disposed on the display offset from the center of the display to allow additional use of the display on the area not used by the information element vectors 230, 232. Information element vectors 230, 232 passing through the middle of the display would prevent using a big portion of the display to displaying a bigger image of a specific information element (for example).

With the non-uniform timeline, each information element 150 is disposed on its respective information element vector 230, 232, illustratively, at its insertion time in the SMLOI. The information element 150 is located at equal distance 800 from the next information elements 150. This information element distribution can similarly be called fixed frequency distribution or constant interval distribution or anything that means the distance between two juxtaposed information elements 150 is sufficiently uniform with other intervals between other juxtaposed information elements 150 disposed on theft respective information element vectors 230, 232 to maximize the number of information elements 150 visible on the display. The time_scale of the timeline is expanded or contracted to accommodate the uniform distribution of the information elements 150 on their respective information element vectors 230, 232.

Time marks 508 identify, either, a change of day, a change of week, a change of month or a change of year. For the purpose of these explanations they identify changes of days 508. That means the distance 804 between time marks 508 is a day, the distance 806 is the day after and the distance 808 is the other following day. The non-uniform locations of these time marks 508 on the vectors 230, 232 are allowing a more constant information elements 150 distribution along the information element axis 230, 232.

On the other hand, and referring now to FIG. 54 with another illustrative example having a different number of information elements 150 on the information element vectors 230, 232, the uniformly distributed timemark 508, similarly identifying either a change of day, a change of week, a change of month or a change of year, indicates that the time is uniformly distributed along information element vectors 230, 232. For the purpose of this explanation lets consider each equal length 810, 812, 814, 816, 818 between two time marks 508 on the information element vector 230 represent the length of one day. On the first day 810, only two information elements 150 have been added in the SMLOI and they proportionally appear on the uniform timeline at the particular moment of the day 810 at the time they have been added in the SMLOI. A distance 813 proportional to the time between the moment both information elements have been entered in the SMLOI appears between the two information elements. Only one information element has been added 150 on the second day 812, none on the third day 814, four information elements 150 the fourth day 816 and so on so forth. This uniform time representation allows to visualize the distribution of information elements 150 along the information element vector 230. The same logic applies to the second information element vector 232.

One of the reasons for changing from a uniform time representation to a non-uniform time representation along the information element vectors 230, 232 can be appreciated if, for instance, a user of the SMLOI zoom-in the interface on the display to a point where only a few information elements 150 from the information element vector 230 (see FIG. 43) are visible on the display. The duration of time of the information element vector 230 visible on the display is quite limited. It would become confusing for the user to have various distances between the information elements 150 when only a limited number of information elements 150 can be seen. Just imagine how unpleasant it would be to navigate along the information element vector 230 when the user hits a three weeks vacation period where nothing has been added in the SMLOI. A long scrolling along an empty information element vector 230 would not be meaningful. This is particularly true in the case of a close zoom-in where there is not enough perspective of the information element vector 230 on the display to appreciate the meaning of a change in distance between two information elements 150. Nonetheless, the time marks 508, 510, 512, 514 will identify when the user change from one day to another.

One down fall of having a fixed distance between two juxtaposed information elements 150 becomes understandable when a zoom-out is made on the SMLOI and a longer duration of time is rendered on the display. Firstly, it is not intuitive for human beings to have different visual representations of time lengths having, in fact, the same duration (e.g. one day has the same duration than the next day even if the number of information elements that appears in both days is different). Secondly, keeping a uniform timeline allows gathering additional meaning from the information elements 150 like, illustratively, the distribution of the information elements 150 on the information element vector 230, 232 over time.

The change between a non-uniform timeline and a uniform timeline preferably occurs automatically depending on the duration of time of the information element vectors 230, 232 that appears on the display. When the user sufficiently zoom-in the vectors 230, 232 on the display, the SMLOI will cross a predetermined view size threshold and use a non-uniform timeline as opposed to a zoom-out, crossing the same view size threshold, procuring a uniform timeline representation of the information element vectors 230, 232 on the display device. The predetermined threshold can be adjusted by the user of the SMLOI to switch from a uniform timeline to a non-uniform timeline, and vice-versa. The change from one timeline to the other can be made in accordance with a desired duration of time of an information element vector appearing on the display. It can also be automatically performed by the SMLOI.

In order to improve the visual meaning associated to particular information elements 150 on information element vectors 230, 232 it is possible to individually vary the size of each information element 150 to get more attention from the user of the SMLOI. For instance, bigger image representation of PDF documents might be desirable if the user has more to deal with PDF documents.

Figure 55:
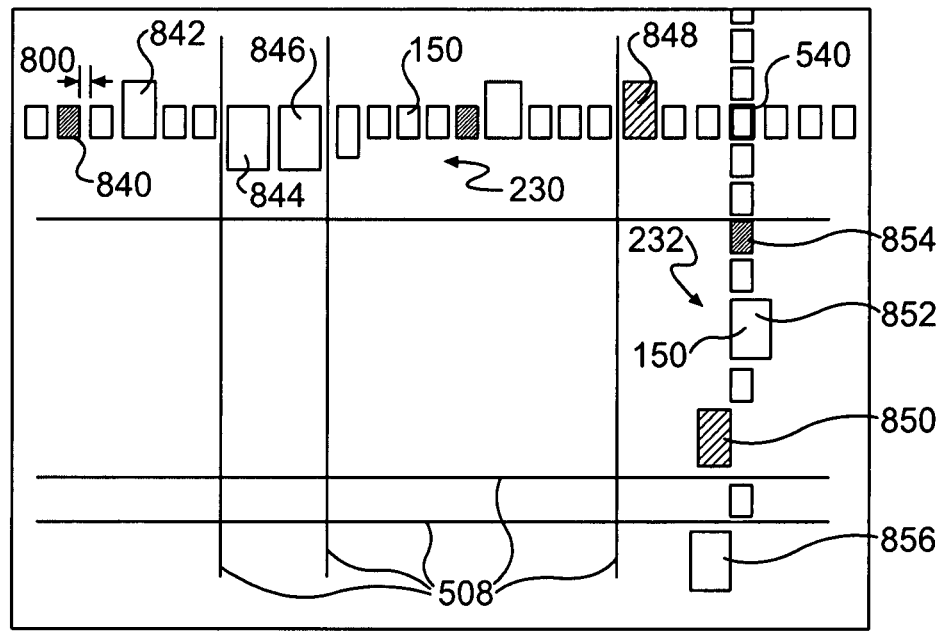
FIG. 55 depicts a bi-dimensional view of the SMLOI using a non-uniform timeline with visual information elements differentiators.

The alignment of the information elements 150 on the information element vectors 230, 232 can also vary to add more meaning to selected information elements 150, or a subset group of information elements 150. Referring to FIG. 55, the information elements 844, 846, related to a specific project, are aligned slightly lower than the rest of the information elements 150 on the same information element vector 230, 232 to be easily differentiable from other information elements 150 not relevant to this specific project. On the vertical information element vector 232 information elements 850 and 856 are aligned more to the left as opposed to all other information elements to visually distinguish them. Still on information element vector 232, information element 852 is enlarged to, illustratively, provide a better view of a document that is statistically consulted more often than the other. The color of the information elements 840, 854 and 848, 850 can vary to bring some difference in the visual representation.

Figure 56:
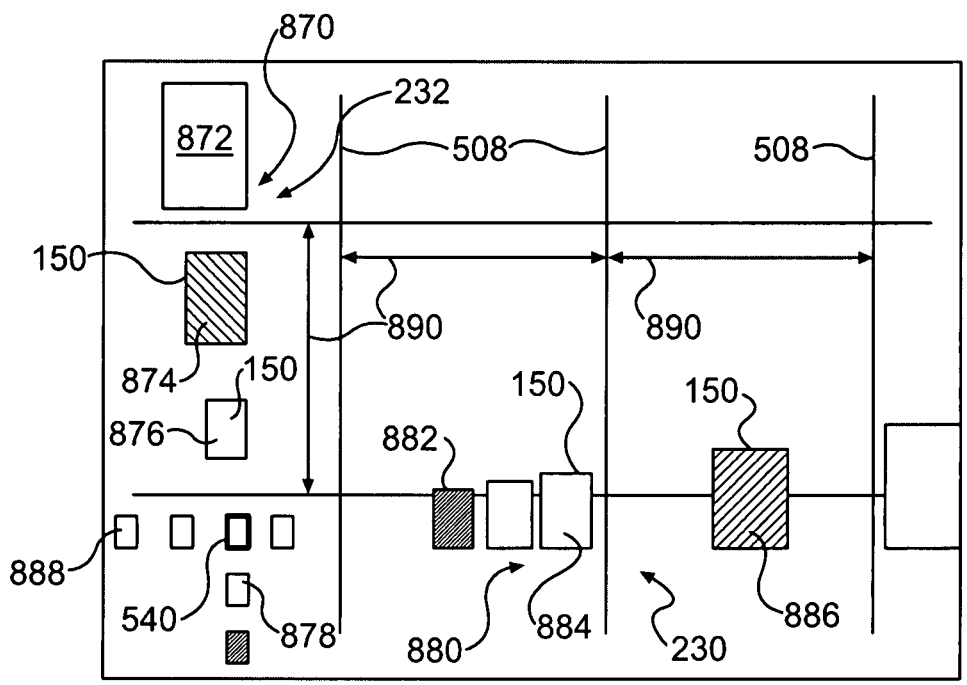
FIG. 56 depicts a bi-dimensional view of the SMLOI using a uniform timeline with visual information elements differentiators and progressive change of size.

FIG. 56 depicts an increase in size 860, 880 of information elements 150 on both information element axis 230, 232. Information elements 150 are magnified according to a linear (or non-linearly, not shown on FIG. 56) rate. Alternatively, magnification of information elements could be maximized at the intersection of both information element vectors 230, 232 without departing from the scope of the invention. Information elements 872, 874, 876, 878, 880, 884, 886 use different colors and size in favor of improving fast visual recognition or related or important information element. On FIG. 56, time marks 508 are using a uniform time scale 890 (as opposed to the non-uniform time scale depicted by time marks 508 on FIG. 55).

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon instructions that, when executed, provide a method of displaying documents, the method comprising:
    (a) displaying an axis of an array of documents at separate display times in different manners by switching between two different types of timescale used for a timeline of the axis, the two different types of timescale comprising a linear timescale of the displayed axis and a nonlinear timescale of the displayed axis, the step of displaying including
        (i) displaying the axis with the timeline having a linear timescale by displaying documents of the axis along the timeline at substantially variable intervals of distance between adjacent documents on the axis, the timescale of the timeline having a time distribution that is substantially constant, with substantially equal periods of time being visually represented in substantially equal lengths of distance along the axis; and
        (ii) displaying the axis with the timeline having a nonlinear timescale by displaying documents of the axis along the timeline at substantially constant intervals of distance between adjacent documents on the axis, the timescale having a time distribution that is substantially variable, with substantially equal periods of time not being visually represented in substantially equal lengths of distance along the axis;
    (b) wherein the switching of the type of timescale of the axis between linear and nonlinear timescales in displaying documents of the axis to the user is effected by input from the user.

2. The non-transitory computer-readable medium of claim 1 having stored thereon instructions that, when executed, provide a method of displaying documents, the method further comprising changing a range of time represented by a portion of a displayed length of the displayed axis, and wherein the documents are arranged in a substantially rectilinear fashion.

3. The non-transitory computer-readable medium of claim 1 having stored thereon instructions that, when executed, provide a method of displaying documents, wherein the input from the user comprises setting of a threshold regarding intervals between adjacent documents to be displayed along the axis.

4. The non-transitory computer-readable medium of claim 1 having stored thereon instructions that, when executed, provide a method of displaying documents, the method further comprising effecting switching from the linear timescale to the non-linear timescale in displaying documents of the axis so that a displayed extent of the axis includes a displayed interval of distance along the axis between two displayed adjacent documents of the axis.

5. An information organizing system, comprising:
    (a) a computing device having a (i) processor and (ii) non-transitory computer-readable medium containing computer-executable instructions for performing a method; and
    (b) a display operatively connected to the computing device for displaying a graphical user interface to a user during performance of the method when the computer-executable instructions are executed;

(c) wherein the method includes the step of,
  (i) determining a manner in which an array of documents are to be shown along an axis having a timeline having a timescale, the manner comprising whether the timeline has a linear timescale or a non-linear timescale,
  (ii) when the determined manner comprise a timeline having a linear timescale, causing to be shown on the display, for view by the user, the documents along the timeline at substantially variable intervals of distance between adjacent documents on the axis, the timescale of the timeline having a time distribution that is substantially constant, with substantially equal periods of time being visually represented in substantially equal lengths of distance along the axis,
  (iii) when the determined manner comprises a timeline having a non-linear timescale, causing to be shown on the display, for view by the user, the documents along the timeline at substantially constant intervals of distance between adjacent documents on the axis, the timescale having a time distribution that is substantially variable, with substantially equal periods of time not being visually represented in substantially equal lengths of distance along the axis, and
  (iv) switching between the linear timescale and the non-linear timescale in displaying documents of the axis to the user, wherein the switching between the linear timescale and the nonlinear timescale in displaying documents of the axis to the user is effected by input from the user.

6. The information organizing system of claim 5, wherein the method therein further comprises effecting switching from the linear timescale to the non-linear timescale in displaying documents of the axis so that a displayed extent of the axis includes a displayed interval of distance along the axis between two displayed adjacent documents of the axis.

7. The non-transitory computer-readable medium of claim 1 having stored thereon instructions that, when executed, provide a method of displaying documents, wherein the step of the method of determining a manner in which an array of documents are to be displayed along an axis having a timeline having a timescale comprises receiving user input representing a selection of the manner in which an array of documents are displayed along an axis having a timeline having a timescale, the selection indicating whether the timeline has a linear timescale or a non-linear timescale.

8. The non-transitory computer-readable medium of claim 1 having stored thereon instructions that, when executed, provide a method of displaying documents, wherein the method further comprises: changing the timescale of the timeline from a linear timescale to a non-linear timescale upon receiving user input representing a change in the manner of display from a linear timescale to a non-linear timescale; changing the timescale of the timeline from a non-linear timescale to a linear timescale upon receiving user input representing a change in the manner of display from a non-linear timescale to a linear timescale; and displaying the array of documents along the axis in accordance with the changed timescale.

9. The non-transitory computer-readable medium of claim 8 having stored thereon instructions that, when executed, provide a method of displaying documents, wherein the method further comprises: transitioning the documents while changing the timescale of the timeline by progressively altering the intervals of distance between documents on the axis.

10. A non-transitory computer-readable medium having stored thereon instructions that, when executed, provide a method for displaying search results, the method comprising:
  (a) determining a manner in which an array of the search results are to be displayed along an axis having a timeline having a timescale, the manner relating to whether the timeline has a linear timescale or a non-linear timescale;
  (b) ordering the search results chronologically;
  (c) when the determination is that the timeline has a linear timescale, displaying the ordered search results along the timeline at substantially variable intervals of distance between adjacent search results on the axis, the timescale of the timeline having a time distribution that is substantially constant, with substantially equal periods of time being visually represented in substantially equal lengths of distance along the axis; and
  (d) when the determination is that the timeline has a non-linear timescale, displaying the ordered search results along the timeline at substantially constant intervals of distance between adjacent search results on the axis, the timescale having a time distribution that is substantially variable, with substantially equal periods of time not being visually represented in substantially equal lengths of distance along the axis; and
  (e) switching between the linear timescale and the nonlinear timescale in displaying search results to the user, wherein the switching between the linear timescale and the nonlinear timescale in displaying search results to the user is effected by input from the user.

11. The non-transitory computer-readable medium of claim 10 having stored thereon instructions that, when executed, provide a method of displaying search results, the method further comprising changing a range of time represented by a portion of a displayed length of the displayed axis, and wherein the results are arranged in a substantially rectilinear fashion.

12. The non-transitory computer-readable medium of claim 10 having stored thereon instructions that, when executed, provide a method of displaying search results, wherein the input from the user comprises setting of a threshold regarding intervals between adjacent search results to be displayed along the axis.

13. The non-transitory computer-readable medium of claim 10 having stored thereon instructions that, when executed, provide a method of displaying search results, the method further comprising effecting switching from the linear timescale to the non-linear timescale in displaying search results so that a displayed extent of the axis includes a displayed interval of distance along the axis between two displayed adjacent search results of the axis.

14. The non-transitory computer-readable medium of claim 10 having stored thereon instructions that, when executed, provide a method of displaying search results, wherein the step of the method of determining a manner in which an array of the search results are to be displayed along an axis having a timeline having a timescale comprises receiving user input representing a selection of the manner in which an array of search results are displayed along an axis having a timeline having a timescale, the selection indicating whether the timeline has a linear timescale or a non-linear timescale.

15. The non-transitory computer-readable medium of claim 10 having stored thereon instructions that, when executed, provide a method of displaying search results, wherein the method further comprises: changing the timescale of the timeline from a linear timescale to a non-linear timescale upon receiving user input representing a change in the manner of display from a linear timescale to a non-linear timescale; changing the timescale of the timeline from a non-linear timescale to a linear timescale upon receiving user input representing a change in the manner of display from a non-linear timescale to a linear timescale; and displaying the search results along the axis in accordance with the changed timescale.

16. The non-transitory computer-readable medium of claim 15 having stored thereon instructions that, when executed, provide a method of displaying search results, wherein the method further comprises: transitioning the search results while changing the timescale of the timeline by progressively altering the intervals of distance between search results on the axis.

17. The information organizing system of claim 5, wherein the input from the user comprises setting of a threshold regarding intervals between adjacent documents to be displayed along the axis.

18. The information organizing system of claim 5, wherein the method therein further comprises changing a range of time represented by a portion of a displayed length of the displayed axis, and wherein the documents are arranged in a substantially rectilinear fashion.

19. The information organizing system of claim 5, wherein the step of the method of determining a manner in which an array of documents are to be displayed along an axis having a timeline having a timescale comprises receiving user input representing a selection by the user of the manner in which an array of documents are displayed along an axis having a timeline having a timescale, the selection indicating whether the timeline has a linear timescale or a non-linear timescale.

20. The information organizing system of claim 5, wherein the method therein further comprises: changing the timescale of the timeline from a linear timescale to a non-linear timescale upon receiving user input representing a change in the manner of display from a linear timescale to a non-linear timescale; changing the timescale of the timeline from a non-linear timescale to a linear timescale upon receiving user input representing a change in the manner of display from a non-linear timescale to a linear timescale; and causing the documents to be shown along the axis in accordance with the changed timescale.

* * * * *